(12) United States Patent
Nakamura et al.

(10) Patent No.: US 7,306,372 B2
(45) Date of Patent: Dec. 11, 2007

(54) TABLE DEVICE

(75) Inventors: Tsuyoshi Nakamura, Yamato (JP);
Nobuhito Saji, Fujisawa (JP);
Hideyuki Tajimi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/250,507

(22) PCT Filed: Apr. 18, 2002

(86) PCT No.: PCT/JP02/03874

§ 371 (c)(1),
(2), (4) Date: Jul. 3, 2003

(87) PCT Pub. No.: WO02/093031

PCT Pub. Date: Nov. 21, 2002

(65) Prior Publication Data

US 2004/0042690 A1  Mar. 4, 2004

(30) Foreign Application Priority Data

| Aug. 11, 2000 | (JP) | 2000-244902 |
| Jan. 19, 2001 | (JP) | 2001-012414 |
| May 15, 2001 | (JP) | 2001-144787 |

(51) Int. Cl.
*F16C 29/06* (2006.01)

(52) U.S. Cl. .......................................... 384/45; 384/59

(58) Field of Classification Search ................ 384/45, 384/55, 59
See application file for complete search history.

(56) References Cited

U.S. PATENT DOCUMENTS 5,011,300 A * 4/1991 Teramachi .................. 384/25
5,088,839 A * 2/1992 Tsukada ...................... 384/45

(Continued)

FOREIGN PATENT DOCUMENTS

JP  56-131010  10/1981

(Continued)

OTHER PUBLICATIONS

Japanese Utility Model Application No. 23862/1991 (Laid-Open No. 27336/1993) (Nippon Thompson Co., Ltd.) Apr. 9, 1993 (Family: None).

(Continued)

*Primary Examiner*—Thomas R. Hannon
(74) *Attorney, Agent, or Firm*—Crowell & Moring LLP

(57) ABSTRACT

A table apparatus with a linear guide device according to the present invention comprises a plurality of members constituting the linear guide device, other members to which the linear guide device is attached and screws for joining a predetermined combination of the members with each other, and screw holes for receiving the screws are formed to the members comprising the combination, and a gas vent hole in communication with a gap formed between the screw and the screw hole by receiving the screw in the screw hole, and the gas vent hole is perforated through the member constituting the table apparatus. When the table apparatus is put under evacuated or depressurized circumstances, remaining air in the gap formed between the screw and the screw hole can be discharged through the gas vent hole in a short period of time, a table apparatus suitable to be used under evacuated or depressurized circumstances can be provided.

3 Claims, 24 Drawing Sheets

U.S. PATENT DOCUMENTS

| | | | |
|---|---|---|---|
| 5,172,982 A * | 12/1992 | Komiya | 384/45 |
| 5,678,928 A | 10/1997 | Agari | |
| 6,142,671 A | 11/2000 | Ise | |
| 6,464,395 B1 * | 10/2002 | Kato et al. | 384/45 |
| 6,532,929 B2 * | 3/2003 | Antonevich et al. | 123/195 R |

FOREIGN PATENT DOCUMENTS

| JP | 60-29923 | 2/1985 |
|---|---|---|
| JP | 63-57908 | 3/1988 |
| JP | 1-118212 | 8/1989 |
| JP | 4-46225 | 4/1992 |
| JP | 7-127625 | 5/1995 |
| JP | 08-170638 | 7/1996 |
| JP | 10-325414 | 12/1998 |
| JP | 2000-014124 | 1/2000 |
| JP | 2002-122135 | 4/2002 |

OTHER PUBLICATIONS

Japanese Utility Model Application No. 2405/1993 (Laid-Open No. 54908/1994) (Nippon Thompson Co., Ltd.) Jul. 26, 1994 (Family: None).

Japanese Office Action w/English Translation, Aug. 29, 2006.

\* cited by examiner

FIG. 15 (i)
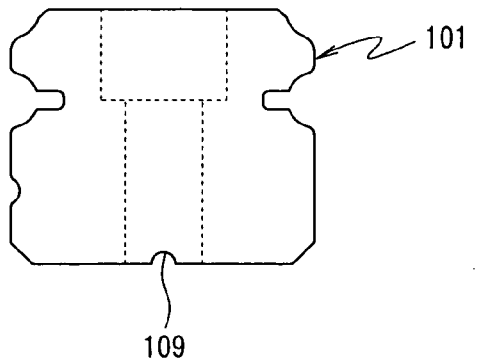
A GROOVE WITH AN ARCUATE CROSS SECTION IS FORMED
FIG. 15 (ii)
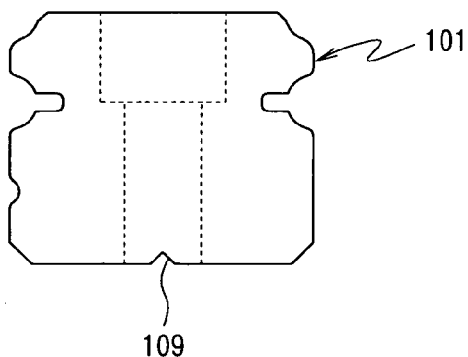
A GROOVE WITH A TRIGONAL CROSS SECTION IS FORMED
FIG. 15 (iii)
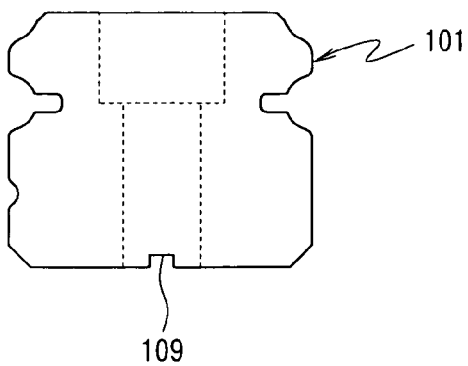
A GROOVE WITH A POLYGONAL CROSS SECTION IS FORMED

FIG. 17 (i)
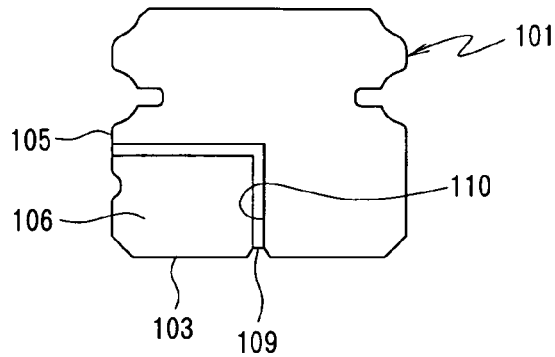
A COMMUNICATION CHANNEL CONNECTING A BOTTOM FACE WITH ONE OF LATERAL SURFACES IS FORMED
FIG. 17 (ii)
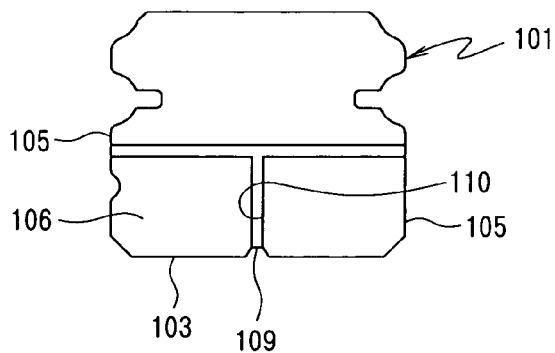
A COMMUNICATION CHANNEL CONNECTING A BOTTOM FACE WITH BOTH OF LATERAL SURFACES IS FORMED
FIG. 17 (iii)
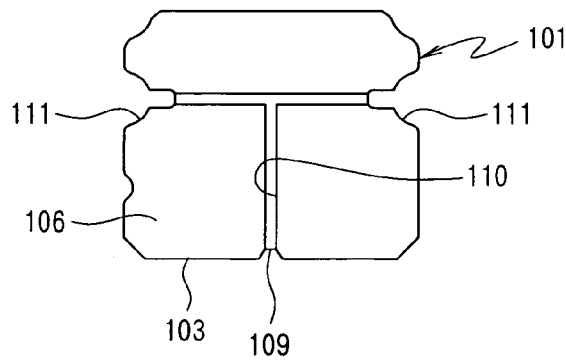
A COMMUNICATION CHANNEL CONNECTING A BOTTOM FACE WITH BOTH OF BALL GROOVES IS FORMED FIG. 22 (i)
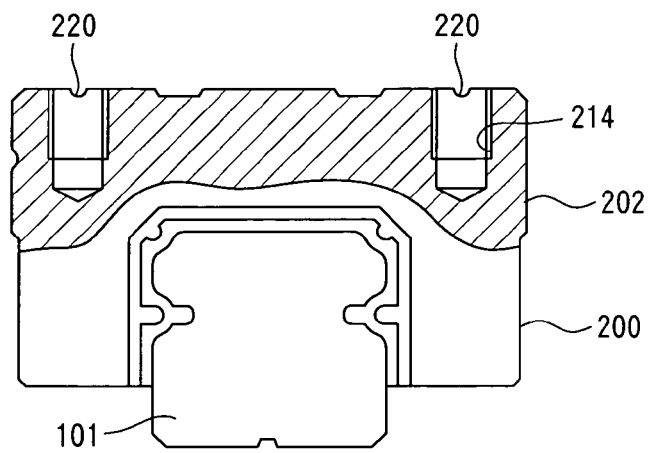
GROOVES WITH AN ARCUATE CROSS SECTION ARE FORMED
FIG. 22 (ii)
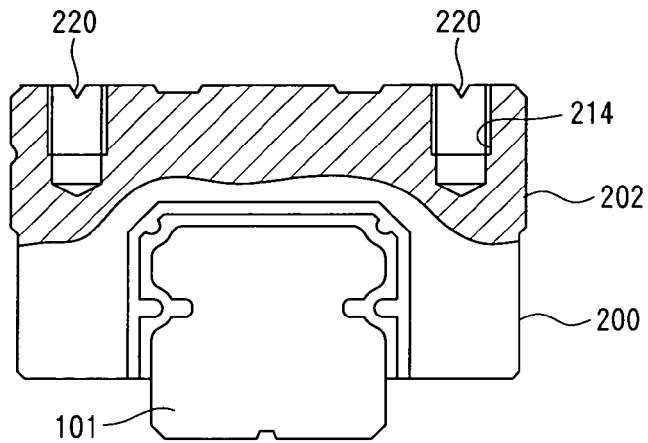
GROOVES WITH A TRIGONAL CROSS SECTION ARE FORMED
FIG. 22 (iii)
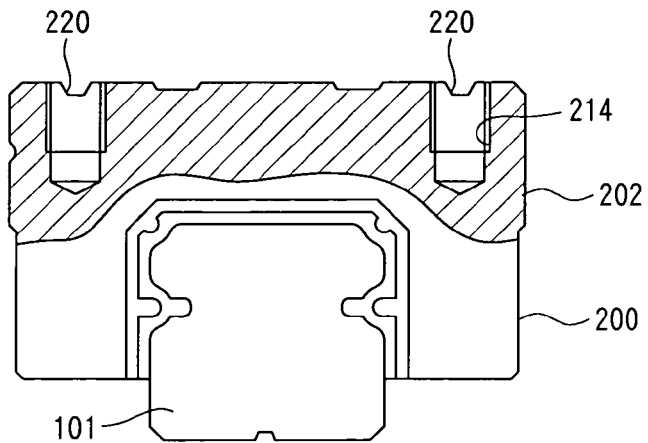
GROOVES WITH A POLYGONAL CROSS SECTION ARE FORMED FIG. 23 (i)
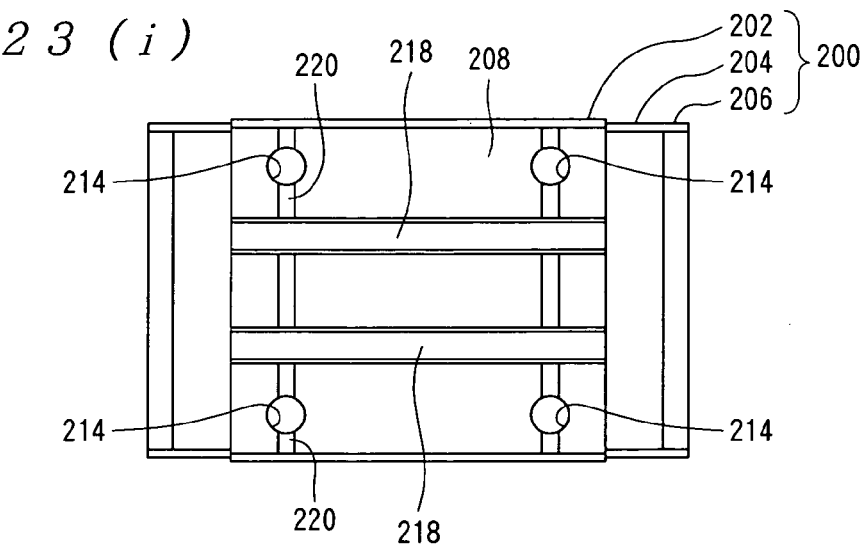
FIG. 23 (ii)
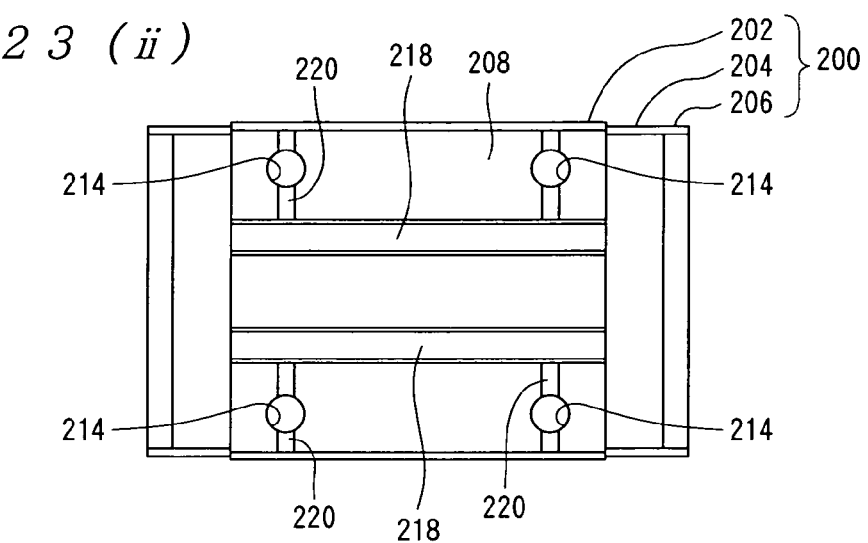
FIG. 23 (iii)
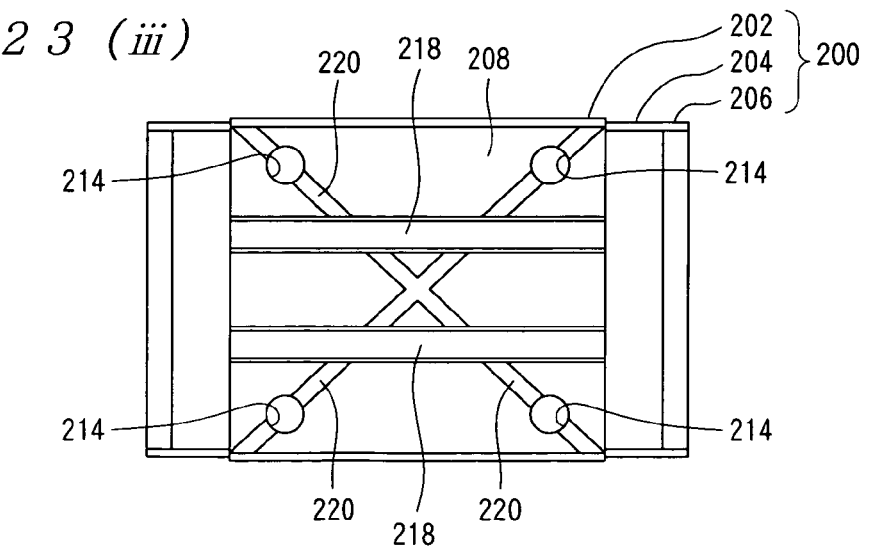

FIG. 27 (a) Prior Art
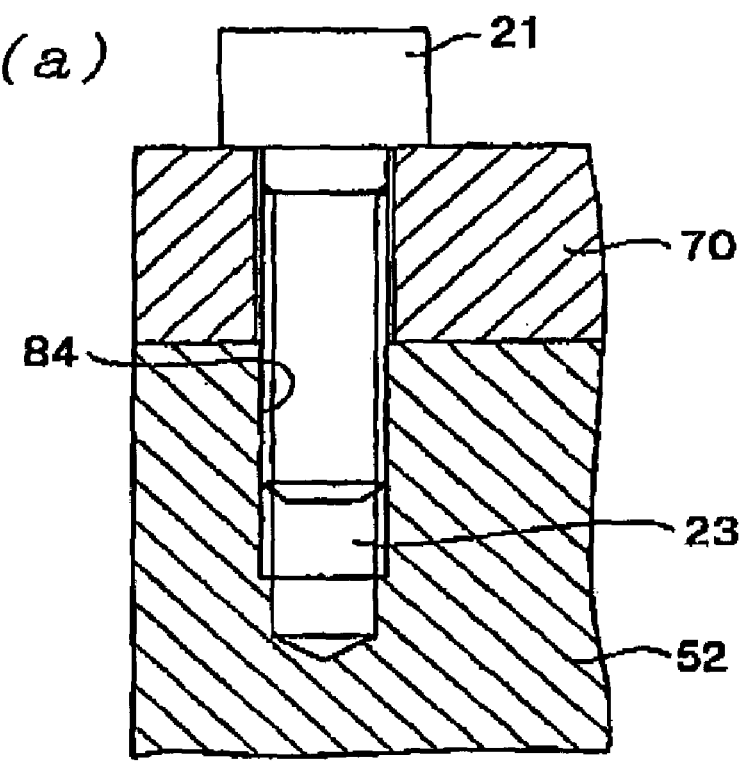
FIG. 27 (b) Prior Art
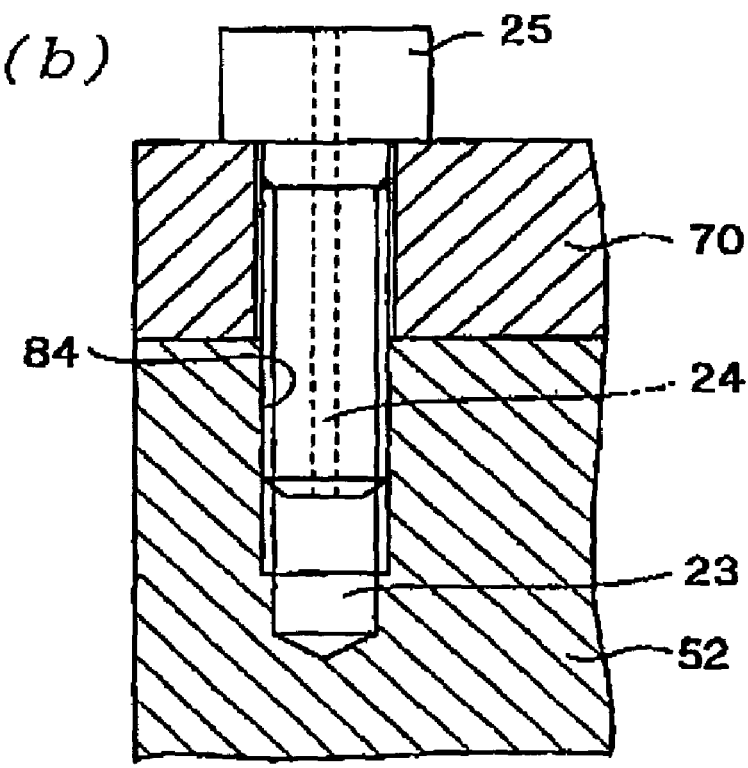

FIG. 28 (a) Prior Art
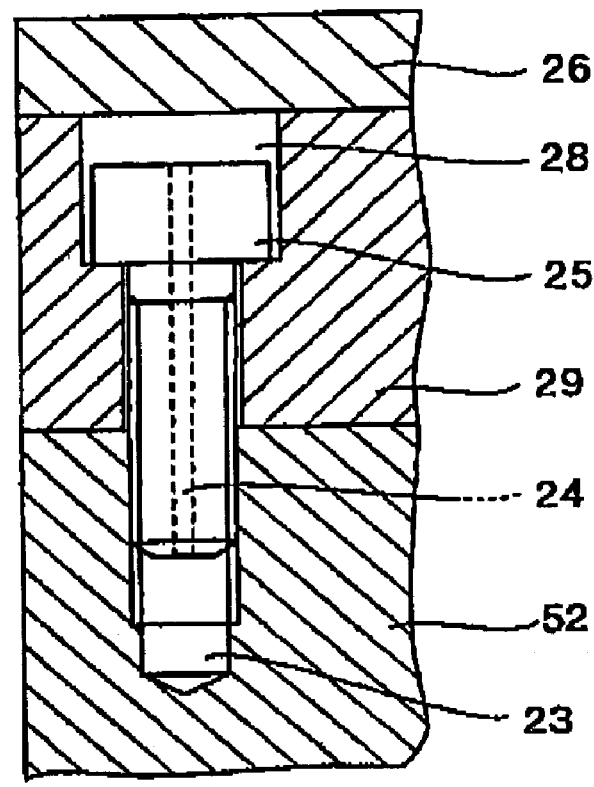
FIG. 28 (b) Prior Art
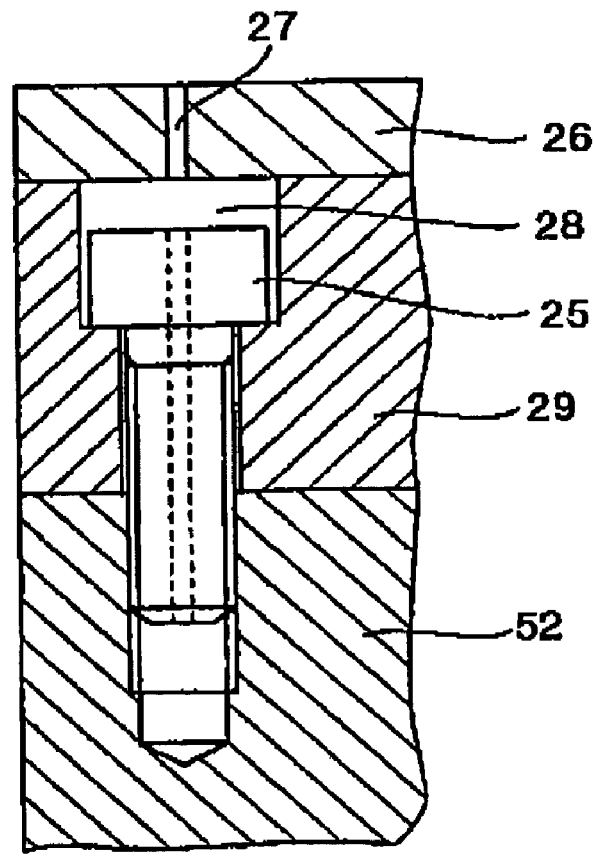

TABLE DEVICE

TECHNICAL FIELD

This invention relates to a linear guide device and a table apparatus with the linear guide device and, more in particular, it relates to a linear guide device having a structure suitable to be used in vacuum or depressurized circumstances, as well as a table apparatus with the linear guide device.

BACKGROUND ART

FIG. 26 shows a perspective view of an existent linear guide device. The linear guide device comprises a guide rail 51 and a slider 60. The slider 60 comprises a slider main body 52, end caps 53 and side seals 54. Then, the linear guide device, a not illustrated guide rail-side member and a not illustrated slider-side member constitute a table apparatus. The not illustrate guide rail-side member is, for example, a substructure to which the guide rail is secured and the not illustrated slider-side member is, for example, a table secured to the slider main body.

The guide rail 51 is extended in one direction and has rolling element grooves 55 on both lateral side wall surfaces in the longitudinal direction. The guide rail 51 is attached to the guide rail-side member by using rail attaching screw holes 56 by means of not illustrated bolts. The slider-side member is attached to the slider main body 52 by using four slider main body attaching screw holes 84 by means of not illustrated bolts.

The slider main body 52 is of a substantially U-shaped cross section with a concave portion in the inside.

When the end caps 53 and the side seals 54 are attached to both longitudinal ends of the slider main body 52, the slider 60 is completed. The end cap 53 and the side seal 54 are integrally attached to the slider main body 52 by using assembling screw holes 85 and not illustrated bolts. Four assembling screw holes 85 are provided on each side of the slider main body 52.

As is well-known so far, rolling elements are loaded in a predetermined circulation channel formed in the slider 60. The slider 60 moves on the guide rail 51 by the rolling motion of the rolling elements between the guide rail 51 and the slider 60 when they conduct endless circulation in the circulation channel.

Description is to be made for a joining member used for attaching the guide rail 51 to the guide rail-side member, a joining member used for assembling the slide 60 and a joining member used for attaching the slider-side member to the slider main body 52, for example, screw.

FIG. 27(a) is an enlarged view of a main portion showing a state of an attaching screw 21 which is screwed and clamped in a receiving portion of the slider main body 52. In this state, the receiving portion is, for example, an attaching screw hole 84, and the slider-side member 70 is attached to the slider main body 52 by screwing and clamping the attaching screw 21 in the attaching screw hole 84. A state of an assembling screw which is screwed and clamped in the assembling screw hole 85 and a state of a rail attaching screw which is screwed and clamped in a rail attaching screw hole 56 are identical to the attaching screw 21 with respect to the surrounding conditions of the bolt.

As shown in FIG. 27(a), when the screw 21 is screwed into the screw hole 84, a gas reservoir 23 as a gap remains at the bottom of the screw hole. When a table apparatus with a linear guide device is assembled by clamping each screw and put in vacuum or depressurized circumstances, the gas reservoir forms "dead space". With evacuation of air by a vacuum pump, a small amount of air slowly and gradually passes through a contacting area between the head of the screw 21 and the slider side member 70. The passing air continuously leaks into the vacuum or depressurized circumstances, even though the screw 21 is tightened completely. Accordingly, it takes a considerable time till such leakage stops, that is, till the pressure in the portion of the gas reservoir 23 is equal to the outside pressure. It takes much time, particularly, in a case where the extent of the outside vacuum condition is high. The gas reservoir causing such a problem is present on every portions where members constituting the table apparatus with the linear guide device are joined to each other by combination of screws and screw holes.

Then, for solving the problem, as shown in FIG. 27(b), it has been known a method to remove the accumulated air in the gas reservoir 23 instantly by using a special screw (gas vent bolt) 25. The special screw 25 has a gas vent hole 24 that axially perforates through a central portion.

However, the special screws are expensive and it is not easy to fabricate vent holes to screws of various sizes used for assembling and combining the members that constitute the table apparatus.

Further, as shown in FIG. 28(a), another member 26 is sometimes attached on the slider-side member 29 to which the slider main body 52 is directly attached. In such a case, when the slider-side member 29 is secured to the slider main body 52 by using a special screw 25, for example, with a gas vent hole 24, there remains a sealed space 28 in a counter head to contain the head of the special screw 25. The space 28 is tightly sealed to the outside by another member 26 and also forms a gas reservoir. Accordingly, even though the special screw 25 is used, both the gas reservoir 23 at the bottom of the screw hole and the space 28 constitute "dead space", and a small amount of air leaks into the vacuum circumstance or depressurized circumstance continuously and gradually.

After all, for coping with such a case, users of the linear guide device have to use the expensive special screws 25 and, further, fabricate the gas vent holes 27 to another member 26.

In view of the problems described above, the present invention intends to provide a linear guide device suitable to be used in vacuum or depressurized circumstances, as well as a table apparatus with the linear guide device without using any special screws formed with the gas vent hole.

DISCLOSURE OF THE INVENTION

For attaining the foregoing object, the invention in accordance with a first aspect provides a table apparatus in which a joining member for joining a predetermined combination for a plurality of members constituting a table apparatus comprising a guide rail, a slider, a guide rail-side member to which the guide rail is attached and a slider-side member to which the slider is attached, and a receiving portion for receiving the joining member are disposed to the members comprising the combination described above, wherein a channel that is in communication from a gap formed between the joining member and the receiving portion by receiving the joining member in the receiving portion to the outside of the table apparatus is formed to at least one of the members that constitute the table apparatus.

The channel is formed in communication from the gap of a gas reservoir formed between the joining member and the receiving portion to the outside of the table apparatus. The air in the gas reservoir is easily discharged through the channel to the outside of the table apparatus.

Any of the known combinations of the joining member and the receiving portion can be applied with no restriction, and the receiving portion receives the joining member and provides a securing and joining structure relative to the joining member. For example, the joining member includes a screw (bolt) or a pin and the receiving portion includes a screw hole (bolt hole), an insertion hole to insert the screw (bolt) or a pin hole. The receiving portion is formed to a member constituting the table apparatus. In the table apparatus, the receiving portion is formed to the guide rail, the slider, the guide rail-side member to which the guide rail is attached or the slider-side member to which the slider is attached. In the slider, the receiving portion is formed to one or all of the slider main body, the end cap, and the side seal.

The channel is formed to any of the members that constitute the table apparatus so as to be in communication with the gap.

The invention in accordance with a second aspect provides a table apparatus in accordance with the first aspect, wherein the channel is a gas vent hole that perforates through at least one of the members constituting the table apparatus.

The air in the gap which forms the gas reservoir between the joining member and the receiving portion is easily discharged to the outside of the table apparatus through the perforated gas vent hole. The gas vent hole is preferably perforated through the member constituting the table apparatus so as to be substantially in perpendicular to the direction along which the receiving portion is formed. Alternatively, the gas vent hole is preferably perforated through the member that constitutes the table apparatus in substantially axial direction along which the receiving portion is formed.

The invention in accordance with a third aspect provides a table apparatus in accordance with the first aspect, wherein the channel is a groove formed on the surface of the member constituting the table apparatus.

The gap forming the gas reservoir between the joining member and the receiving portion is in communication with the outside of the table through the groove, and the air in the gas reservoir is easily discharged to the outside of the table apparatus.

The invention in accordance with a fourth aspect provides a table apparatus in accordance with the third aspect, wherein the receiving portion is a receiving portion with which the slider and the slider-side member are combined and joined to each other, that is, a plurality of attaching screw holes that open on each of the surfaces of the slider and the slider-side member combined and opposed to each other, the groove is formed on at least one of the surfaces of the slider and the slider-side member opposed to each other, and the groove is in contiguous from the opening of the attaching screw hole to the end of a portion where the opposing surfaces are in contact with each other.

The invention in accordance with a fifth aspect provides a table apparatus in accordance with the third aspect, wherein the receiving portion is a receiving portion with which the guide rail and the guide rail-side member are joined, that is, a plurality of attaching screw holes that open on each of the surfaces of the guide rail and the guide rail-side member combined and opposed to each other, the groove is formed on at least one of the surfaces of the guide rail and the guide rail-side member combined and opposed to each other, the groove is formed on at least one of the surfaces of the guide rail and the guide rail-side member combined and opposed to each other, and the groove is in contiguous from the opening of the attaching screw hole to the end of a portion where the opposing surfaces are in contact with each other.

The invention in accordance with a sixth aspect provides a table apparatus in accordance with the fourth or fifth aspect, wherein the groove has a communication channel that is in communication to a surface of the member in which the groove is formed and to the surface is one of the surfaces on which the groove is not formed.

Even though the end of the groove is closed, the groove is in communication with the outside of the table apparatus through the communication channel. Accordingly, the air in the gap which forms the gas reservoir between the attaching screw hole and the attaching screw is easily discharged through the groove and the communication channel to the outside of the table apparatus.

The communication channel includes a channel perforating through the inside of the member constituting the table apparatus on which the groove is formed, and another groove on a surface of the member constituting the table apparatus in which the groove is formed and the surface is adjacent with the surface where the groove is formed.

The invention in accordance with a seventh aspect provides a table apparatus in which a joining member for joining a predetermined combination for a plurality of members constituting a table apparatus comprising a guide rail, a slider, a guide rail-side member to which the guide rail is attached and a slider-side member to which the slider is attached, and a receiving portion for receiving the joining member are disposed to the members comprising the combination described above, wherein the joining member comprises an attaching screw and the receiving portion comprises an attaching screw hole, the attaching screw is screwed in the attaching screw hole with a washer being interposed between the head of the attaching screw and the attaching screw hole, and the washer has a channel that is in communication from a gap formed between the attaching screw and the attaching screw hole to the outside of the table apparatus.

The washer situates below the head of the attaching screw and the attaching screw is screwed in the attaching screw hole. Accordingly, the washer closes a portion above the gap which forms the gas reservoir between the attaching screw hole and the attaching screw and, further, the head of the attaching screw covers a portion above the washer. Then, since the washer has the channel connecting from the gas reservoir to the outside of the table apparatus, the air in the gas reservoir is easily discharged to the outside of the table apparatus through the channel of the washer.

BRIEF EXPLANATION OF THE DRAWINGS

FIGS. 15(i) to (iii) are end views of guide rails showing modified examples of the shape of the groove.

FIGS. 17(i) to (iii) are end views of guide rails showing modified examples of the shape of a communication channel.

FIGS. 22(i) to (iii) are partially cross sectioned side elevational views of sliders in the longitudinal direction of the guide rail according to modified examples of the cross sectional shape of the groove.

FIGS. 23(i) to (iii) are upper plan views of sliders according to modified examples of the arrangement of grooves.

FIG. 27 shows an existent table apparatus in which (a) is an enlarged view for a main portion and (b) is a view showing the improvement in (a).

FIG. 28 shows an existent table apparatus in which (a) is an enlarged view for a main portion and (b) is a view showing the improvement in (a).

BEST MODE FOR PRACTICING THE INVENTION

A first embodiment of the present invention is to be described with reference to FIG. 1 to FIG. 4.

Figure 1:
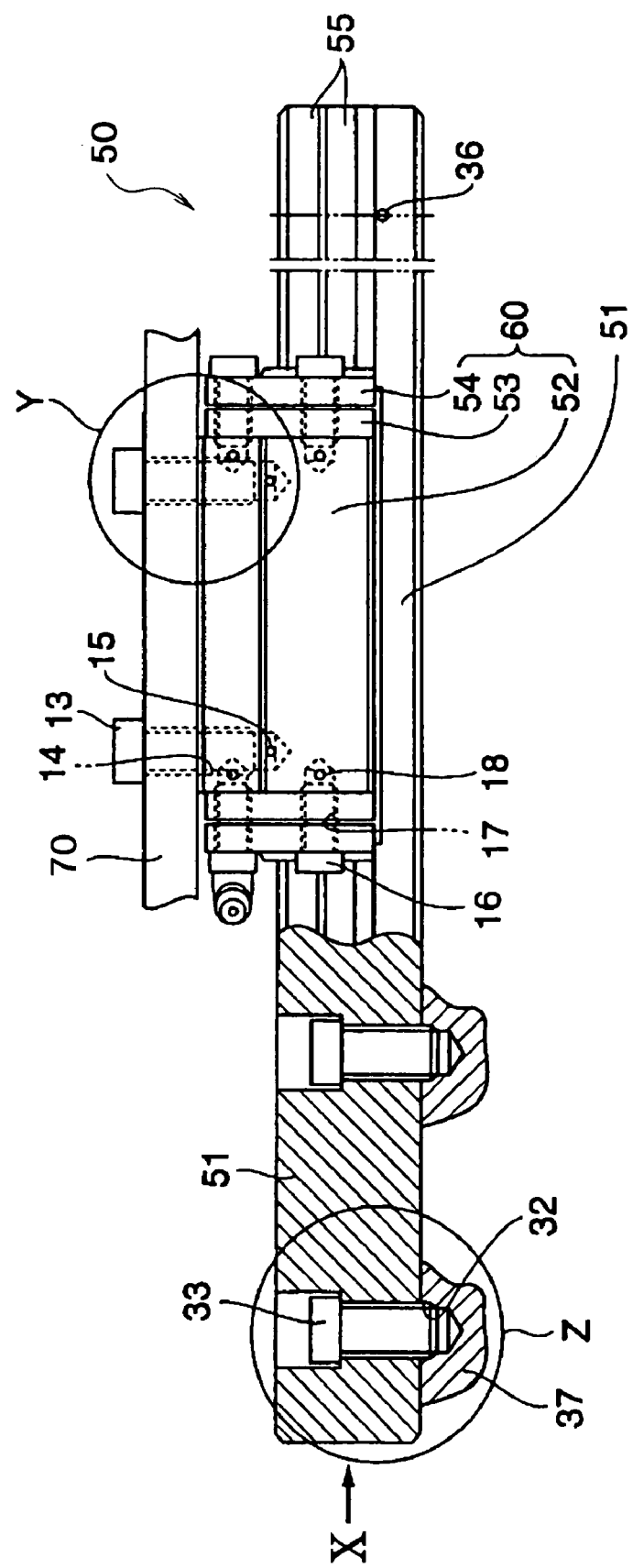
FIG. 1 is a front elevational view of a table apparatus according to the embodiment of the present invention which partly shows a cross sectional view and partly shows a perspective view.
Figure 2:
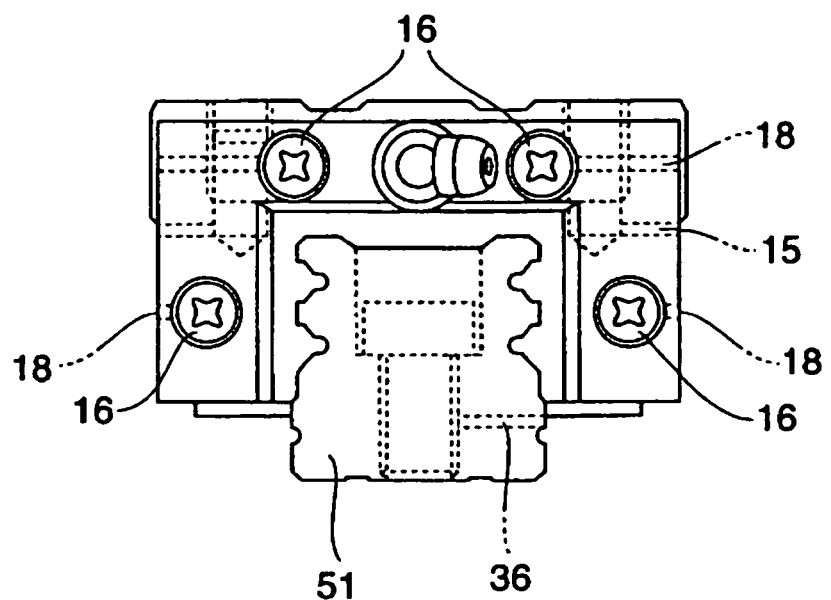
FIG. 2 is a side elevational view of the linear guide device constituting the table apparatus of FIG. 1 as viewed along the direction X.
Figure 3:
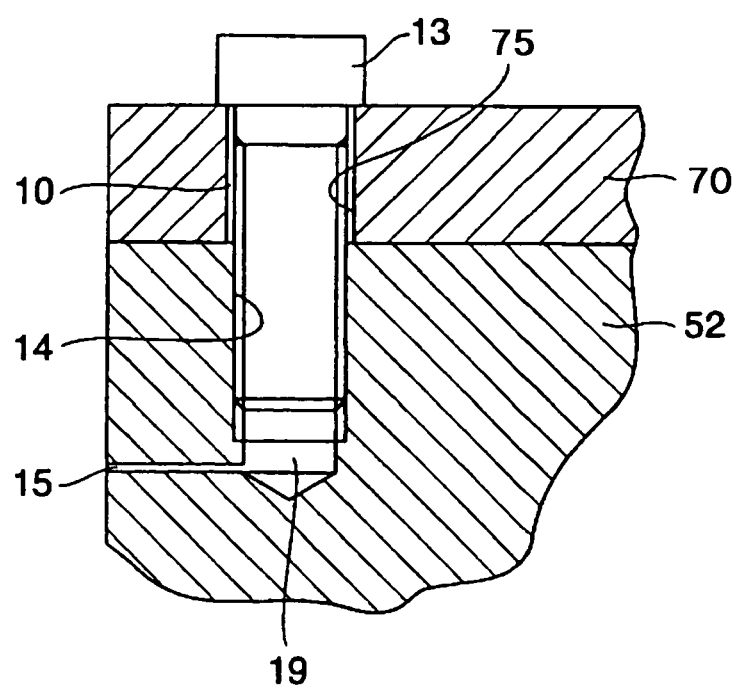
FIG. 3 is an enlarged view of portion Y in FIG. 1 as viewed from the right side.
Figure 4:
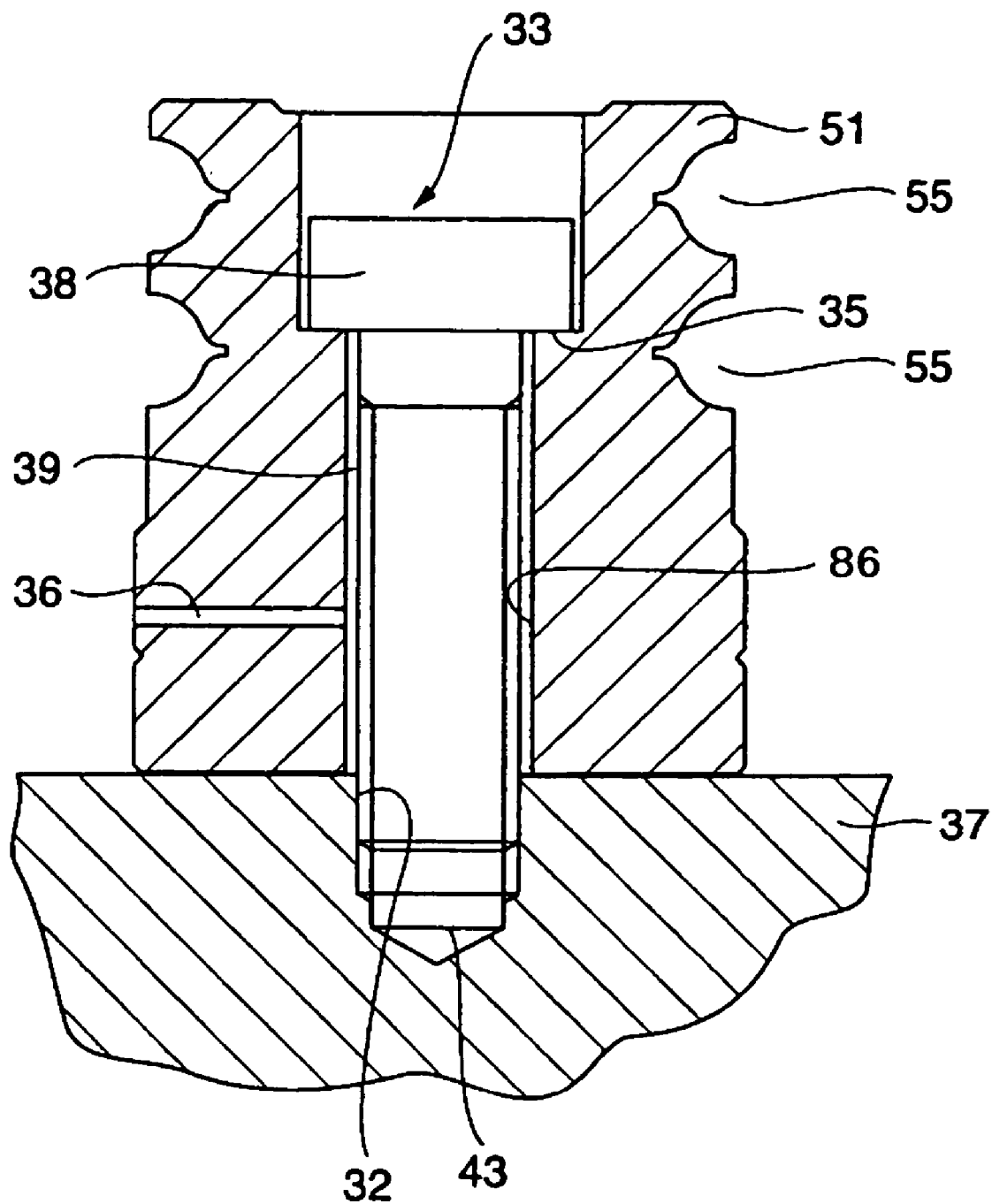
FIG. 4 is an enlarged view of portion Z in FIG. 1 as viewed from the right side.

FIG. 1 is a front elevational view showing a table apparatus comprising a linear guide device having a guide rail 51 and a slider 60, a slider-side member 70 attached to the linear guide device and a substructure 37 as a guide rail-side member to which the linear guide device is attached, which is partly shown as a cross sectional view and also partly shown as a perspective view. FIG. 2 is a side elevational view of the linear guide device having the guide rail 51 and the slider 60 of the FIG. 1 as viewed along the direction X. FIG. 3 is an enlarged view of portion Y in FIG. 1 viewed from the right side and FIG. 4 is an enlarged view showing portion Z in FIG. 1 viewed from the right side.

As shown in FIG. 1, the table apparatus according to this embodiment comprises a linear guide device 50 having the guide rail 51 and the slider 60, the slider-side member 70 and the substructure 37 as the guide rail-side member. The slider 60 comprises a slider main body 52, end caps 53 and side seals 54 as main components. Among the constitution of the linear guide device 50, the constitutions identical with those explained as the prior art carry the same reference numerals, for which explanation is to be omitted.

The slider main body 52 is attached to the slider-side member 70 with four slider main body attaching screws (retainer bolts) 13. The slider main body attaching screw 13 is screwed in the slider main body attaching screw hole 14.

FIG. 3 shows an enlarged view of the portion Y in FIG. 1, that is, a view of a portion where the slider main body attaching screw 13 is screwed in the screw hole 14 as viewed from the right side in FIG. 1. The slider-side member 70 has screw insertion holes 75 and the diameter of the screw insertion hole 75 is slightly larger than the diameter of the retainer bolt (screw 13) which has a hexagon socket head. The retainer bolt (screw 13) is allowed to pass therethrough the screw insertion hole 75. The slider main body 52 has a screw hole in which the screw 13 is screwed. The screw insertion hole 75 and the screw hole of the slider main body 52 comprise a slider main body attaching screw hole 14. Further, a gap 10 is formed as a gas reservoir between the screw insertion hole 75 of the slider-side member 70 and the screw 13.

A gas reservoir 19 is formed in the lower hole portion of the slider main body attaching screw hole 14. A gas vent hole 15 in communication with the gas reservoir 19 is perforated through the slider main body 52. The direction of the gas vent hole 15 is substantially in perpendicular to the direction of the slider main body attaching screw hole 14, and the other end of the gas vent hole 15 is open to the outside of the slider main body 52.

As shown in FIG. 2, the end caps 53, the side seals 54 and the slider main body 52 are integrally assembled by assembling screws 16 (bolt with a cross recessed head in this embodiment). Four assembling screws 16 are provided on each side of the slider main body 52. Screw insertion holes formed in the end cap 53 and the side seal 54, and the screw hole formed in the slider main body 52 comprise an assembling screw hole 17. The screw 16 is screwed in the assembling screw hole 17.

As shown in FIG. 1, an air vent hole 18 is perforated in the slider main body 52 from the lower hole portion of the assembling screw hole 17. The direction of the air vent hole 18 is substantially in perpendicular to the axial direction of the assembling screw hole 17.

The joining relation between the assembling screw 16 and the assembling screw hole 17 is identical with the joining relation between the slider main body attaching screw 13 and the slider main body attaching screw hole 14 shown in FIG. 3 except for that two members, that is, the end cap 53 and the side seal 54 are present at the portion where the slider-side member 70 exists in FIG. 3.

In FIG. 1, the guide rail 51 is secured to the substructure 37 with rail attaching screws 33. The rail attaching screw 33 is screwed in a rail attaching screw hole 32.

FIG. 4 shows portion Z of FIG. 1, that is, a portion where the rail attaching screw 33 is screwed in the rail attaching screw hole 32 as viewed from the right side in FIG. 1 in an enlarged scale.

A head 38 of the rail attaching screw 33 abuts against a counter head 35 of the guide rail 51. The guide rail 51 has screw insertion holes 86 and the diameter of the screw insertion hole 86 is slightly larger than the diameter of the retainer bolt (screw 33) which has a hexagon socket head. The retainer bolt (screw 33) is allowed to pass therethrough the screw insertion hole 86. The substructure 37 has a screw hole in which the screw 33 is screwed. The screw insertion hole 86 and the screw hole of the substructure 37 comprise a rail attaching screw hole 32. Further, a gap 39 is formed as a gas reservoir between the screw insertion hole 86 of the guide rail 51 and the screw 33. Further, a gas reservoir 43 is formed in the lower hole portion of the rail attaching screw hole 32.

A gas vent hole 36 in communication with the gap 39 is perforated through the guide rail 51. The direction of the gas vent hole 36 is substantially in perpendicular to the direction of the rail attaching screw hole 32, and the other end of the gas vent hole 36 is open to the outside of the guide rail 51.

Then, description of a case is to be made, where the slider main body attaching screw 13 is screwed in the slider main body attaching screw hole 14 and the rail attaching screw 33 is respectively screwed in the rail attaching screw hole 32, thereby the guide rail 51, the slider 60, the slider-side member 70 and the substructure 37 are assembled, and the air is vented from the circumstances by evacuation or depressurization.

In FIG. 3, under the evacuated or depressurized circumstances, remaining air in the gas reservoir 19 is led to the outside of the slider main body 52 through the gas vent hole 15. Further, in the screwed portion between the slider main body attaching screw 13 and the hole in the slider main body 52, the gap between them is not completely eliminated. Due to the coupling the tops of the male threads with the tops of the females threads, the gap has a spiral shape, some amount of air, although little, is left in the gap and the gap forms a gas reservoir. Although the volume of the gap is, in itself, small, but when compared with the contacting face between the head of the slider main body attaching screw 13 and the slider-side member 70, the volume of the gap is large enough. Accordingly, remaining air in the gap 10 is led into the lower hole portion through the spiral gap and, further, led to the outside of the slider through the gas vent hole 15. As described above, the remaining air in the gaps (10 and 19) formed between the slider main body attaching screws 13 and the screw hole 14 can be led to the outside of the slider main body 52 in a short period of time.

Remaining air in the gap between the assembling screw 16 and the assembling screw hole 17 is also led to the outside of the slider in the same manner as described above.

In FIG. 4, when put in evacuated or depressurized circumstances, remaining air in the gap 39 is led to the outside of the guide rail 51 through the gas vent hole 36. Further, in the same manner as in FIG. 3, since a spiral gap is formed in the coupled portion between the rail attaching screw 33 and the rail attaching screw hole 32, remaining air in the gas reservoir 43 is led from the lower hole portion to the gap 39 through the spiral gap and then further led to the outside of the table apparatus (linear guide device) through the gas vent hole 36. As described above, remaining air in the gaps (39 and 43) formed between the rail attaching screw 33 and the screw hole 32 can be led to the outside of the table apparatus (linear guide device) through the gas vent hole 36 in a short period of time.

Figure 29:
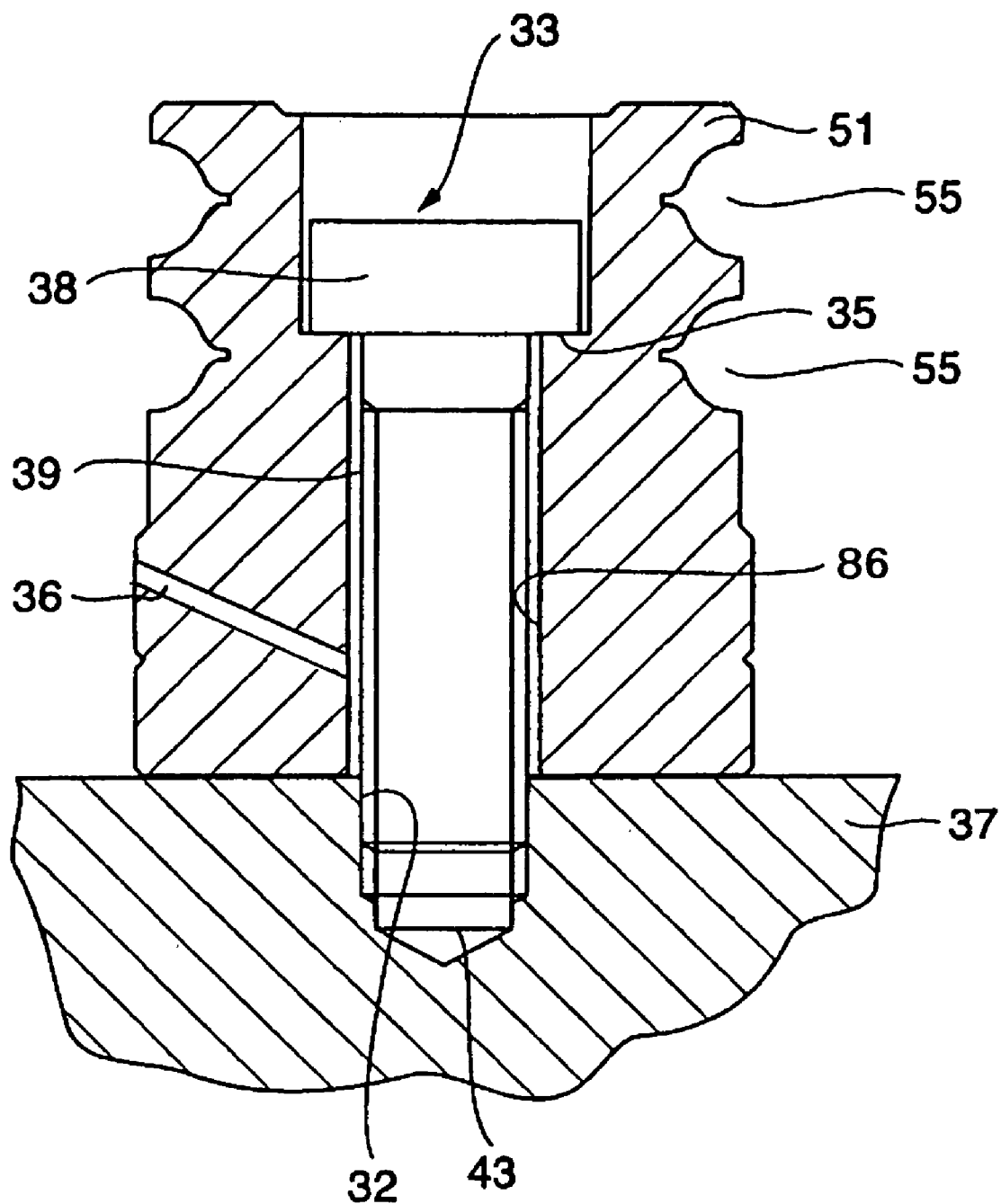
FIG. 29 shows a side view of a portion of a table apparatus according to one embodiment of the invention.

In the foregoings, description has been made to the case where the gas vent holes 15, 18 and 36 are respectively perforated in a direction substantially perpendicular to the axial directions of the slider main body attaching screw hole 14, the assembling screw hole 17 and the rail attaching screw hole 32. But the present invention is not restricted only thereto but the gas vent holes can be perforated obliquely to the axial directions of the screw holes as shown, for example, in FIG. 29.

Further, while description has been made to the case where the slider has side seals, it is apparent that this embodiment is also applicable to a linear guide device without side seals or a linear guide device with other inserted members.

In this embodiment, due to the constitution described above, usual screws can be used and there is no requirement to use any special screws and errors can be prevented in the selection of screws upon assembling. Further, when the gas vent holes 15, 36, etc. are formed to the guide rail 51 or the slider 60 which comprises the linear guide device, it is not necessary for a user of the linear guide device to fabricate a gas vent hole additionally in a mating member to which the linear guide device is attached, and the cost can be reduced.

Then, a second embodiment of this invention is to be described with reference to FIG. 5.

Figure 5:
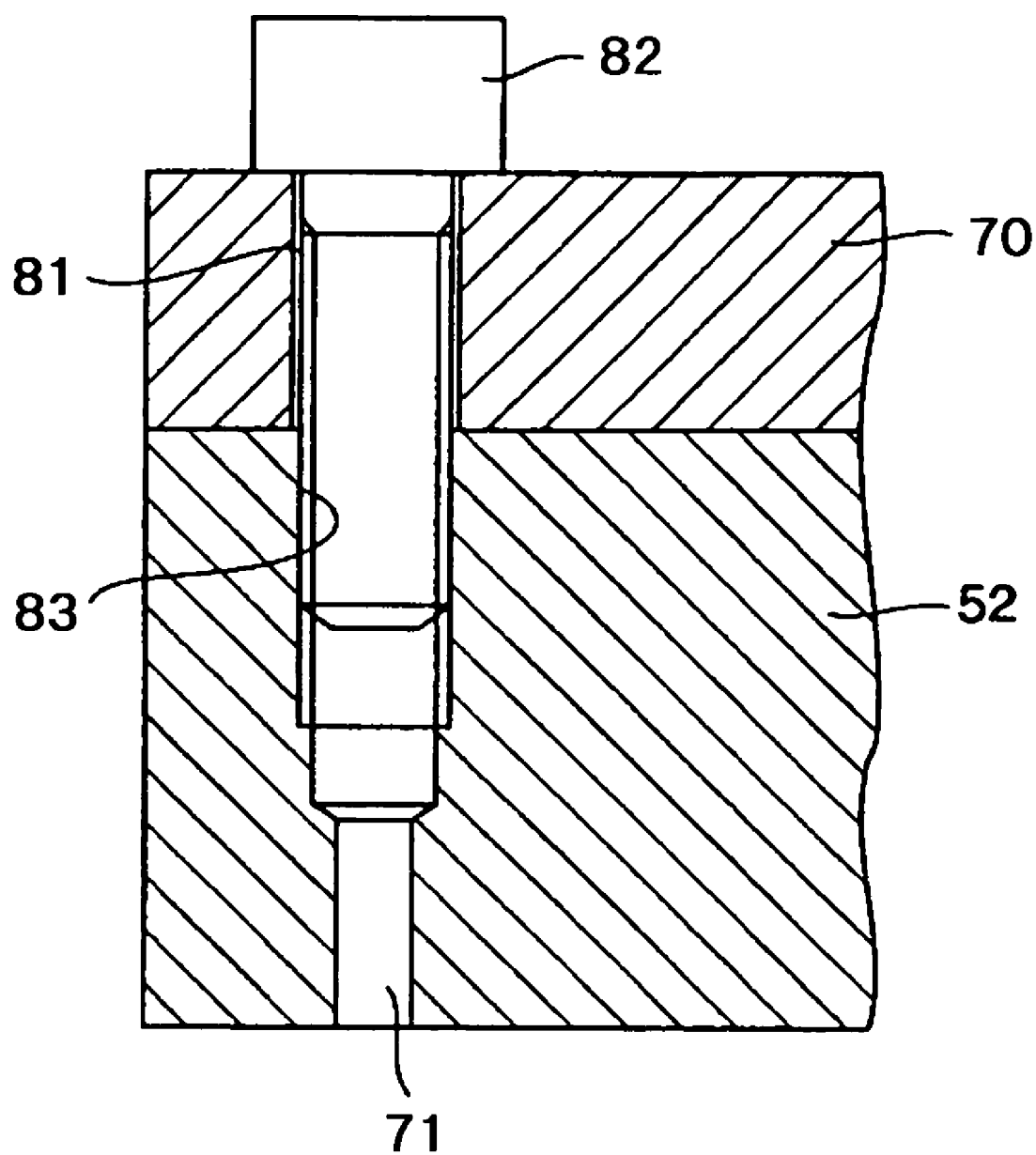
FIG. 5 is an enlarged view of a main portion according to the second embodiment.

As shown in FIG. 5, a linear guide device of this embodiment is different from the linear guide device of the first embodiment in the point, that is, a gas vent hole 71 is perforated from a lower hole portion of a slider main body attaching screw hole 83 to the outside of the slider main body substantially in the axial direction of the slider main body attaching screw hole 83.

Also in this embodiment, in a case where a slider main body attaching screw 82 with a hexagon socket head as a retainer bolt is screwed in the slider main body attaching screw hole 83 and then the linear guide device is put in evacuated or depressurized circumstances, air in the lower hole portion is led to the outside of a slider main body 52 through the gas vent hole 71, and remaining air in a gap 81 that is formed between a slider-side member 70 and the slider main body attaching screw 82 is led to the outside of the slider main body 52 through a spiral gap and the gas vent hole 71.

As in this embodiment, in a case where the gas vent hole 71 is perforated substantially in the axial direction of the slider main body attaching screw hole 83, remaining air in the gap formed between the slider main body attaching screw 82 and the screw hole 83 can be led to the outside of the slider main body 52 in a short period of time.

In addition, since the axis of the gas vent hole 71 is the axis of the screw hole 83 of the slider main body 52 and the lower hole of the screw hole 83, labor over fabrication of the hole to the slider main body 52 can be saved.

As a modified example of the second embodiment, the slider main body attaching screw hole and the gas vent hole can be identical with the constitution shown in FIG. 5, the gas vent hole can be perforated substantially in the axial direction of the slider main body attaching screw hole from the lower hole portion of the slider main body attaching screw hole to the outside of the slider main body, the arranged position of each assembling screw hole can be somewhat shifted from the position shown in FIG. 2 of the first embodiment, and the lower hole of each assembling screw hole can be crossing and be in communication with the lower hole of the slider main body attaching screw hole or the gas vent hole of the slider main body attaching screw hole.

With the constitution described above, same effects can be obtained as in the first embodiment and the second embodiment, and the number of fabrication steps of the slider main body can be decreased.

Then, a third embodiment of the present invention is to be described with reference to FIG. 6.

Figure 6:
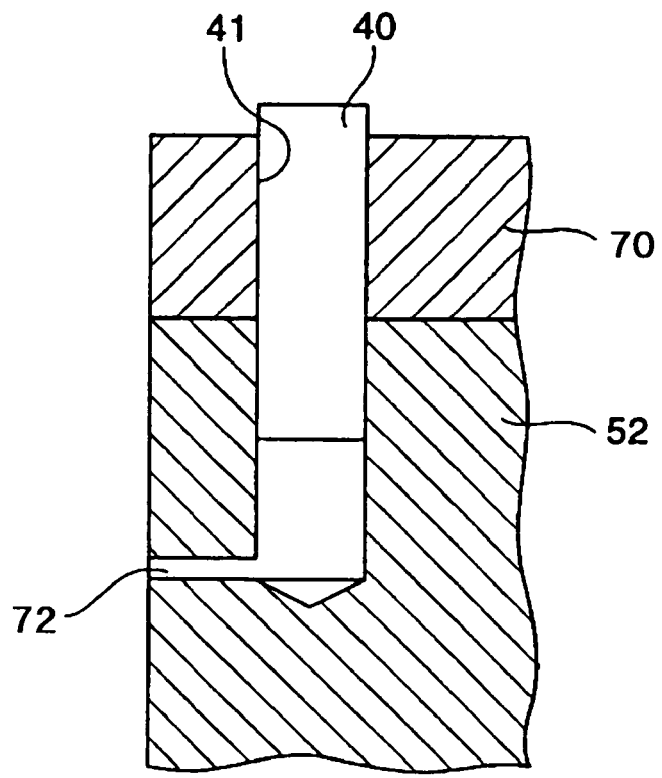
FIG. 6 is an enlarged view of a main portion according to the third embodiment.

As shown in FIG. 6, a linear guide device of this embodiment is different from the linear guide device of the first embodiment in the points, that is, a slider main body attaching pin 40 is used instead of the slider main body attaching screw, and a pin hole 41 is formed in a slider-side member 70 and a slider main body 52 instead of the slider main body attaching screw hole.

Also in this embodiment, the pin 40 is fitted in the pin hole 41 and then the linear guide device is put in evacuated or depressurized circumstances. Remaining air in the lower hole portion of the pin hole 41 is led to the outside of the slider main body through a gas vent hole 72.

As in this embodiment, in a case where the gas vent hole 72 is perforated from the slider main body attaching pin hole 41, remaining air in the gap between the pin 40 and the pin hole 41 (lower hole portion) can be led to the outside of the slider main body 52 in a short period of time.

In the first to third embodiments, descriptions have been made for the cases where the guide rail attaching receiving portion is a counter head hole, it is not restrictive to these cases. The guide rail attaching receiving portion can be a hole as shown in FIG. 3, and receiving portion for the slider main body attachment and the receiving portion for assembling can be counter head holes so far as the head of the bolt does not interfere the sliding movement of the slider.

Further, in the first to the third embodiments, descriptions have been made for the cases where a bolt with a hexagon socket head or a bolt with a cross recessed head is used as a screw, it is not restrictive to these cases. Various kinds of bolts such as a hexagonal screw (bolt with a hexagon head) can be properly selected and used.

Further, in the first to third embodiments, the descriptions have been made for the cases where the mating member to which the guide rail is attached is the substructure and the mating member to which the slider main body is attached is the slider-side member. But inversely, the mating member to which the guide rail is attached can be the slider-side member and the mating member to which the slider main body is attached can be the substructure.

Accordingly, owing to the table apparatus having the constitution of the first to third embodiments, there is no requirement to use any special screws and usual screws can be used for fixing the end caps and the side seals on the slider main body, for mounting the slider main body with the slider-side member, and for securing the guide rail to the substructure. Further, there is no requirement to form any gas vent holes in the slider-side member and the substructure. As a result, errors can be prevented in the selection of screws for assembling the table apparatus and the number of special parts can be reduced. Further, since there is no requirement to fabricate any vent holes in the slider-side member or the substructure, it is possible to provide a linear guide device or a table apparatus at a reduced cost.

Further, when the gas vent hole is formed from the lower hole portion of the screw hole and the axis of the gas vent hole is the axis of the screw hole, labor over fabrication of the hole such as to the slider main body can be further saved and a linear guide device can be provided at a reduced cost.

Further, when the lower hole of the slider main body attaching screw hole or the gas vent hole is in communication with the lower hole of the assembling screw hole, the number of fabrication steps of the slider main body can be decreased further.

Figure 7:
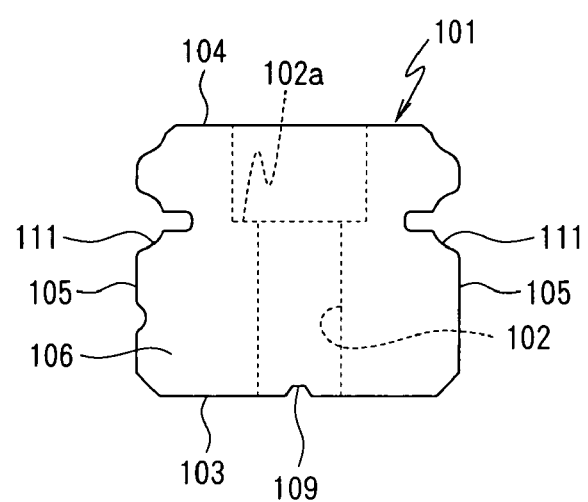
FIG. 7 is an end view in the longitudinal direction of a guide rail according to the fourth embodiment.
Figure 8:
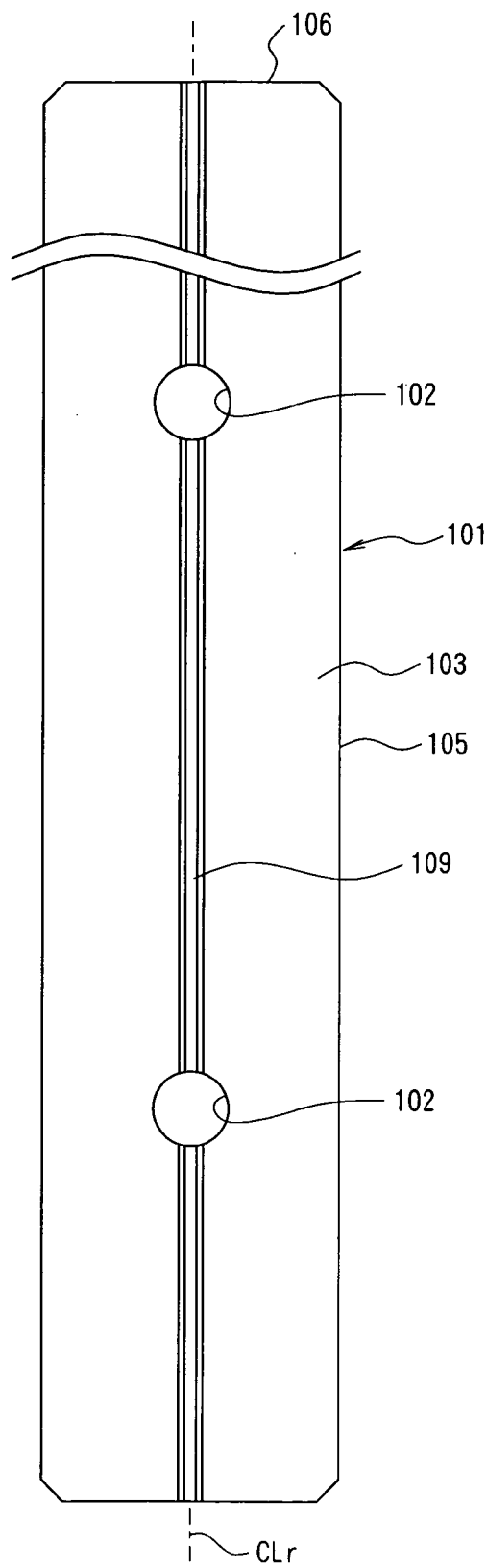
FIG. 8 is a bottom view of FIG. 7.
Figure 9:
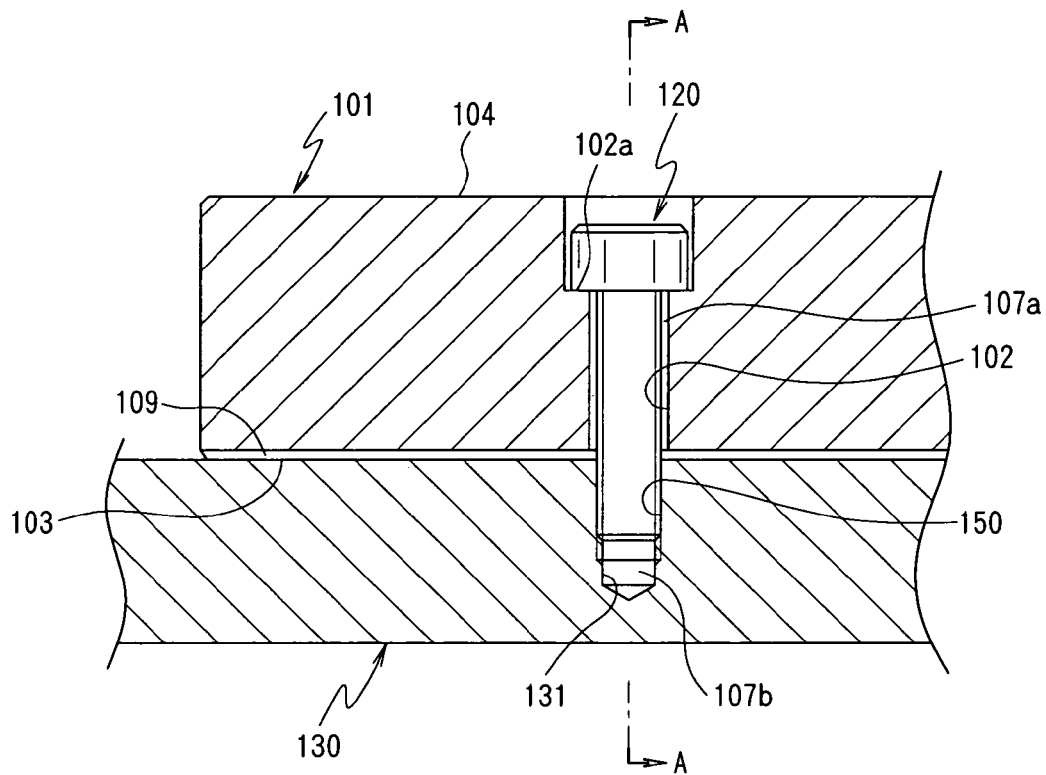
FIG. 9 is a longitudinal cross sectional view in a state of the secured guide rail of FIG. 7 to a substructure.
Figure 10:
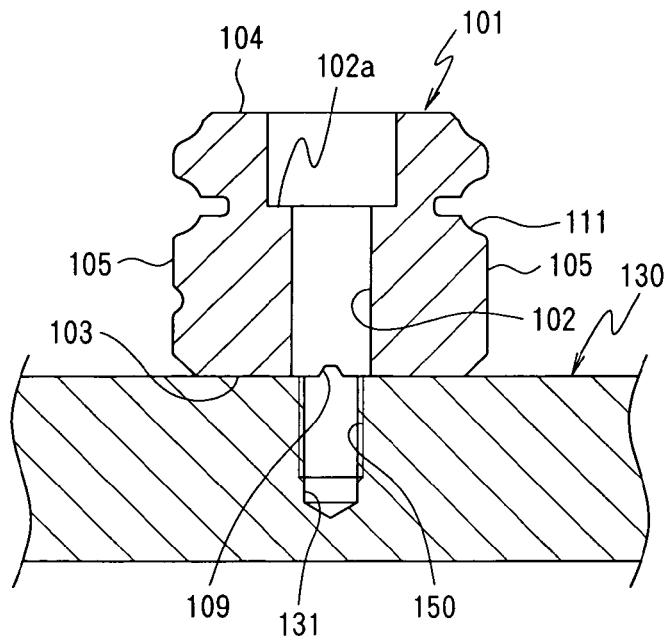
FIG. 10 is a cross sectional view taken along line A—A in FIG. 9 with the rail attaching screw being omitted.

Then, a fourth embodiment according to the present invention is to be described with reference to FIG. 7 to FIG. 10. FIG. 7 shows the fourth embodiment and is an end face view in the longitudinal direction of a guide rail, FIG. 8 is a bottom view of the guide rail in the fourth embodiment, FIG. 9 is a vertical cross sectional view in a state where the guide rail is secured to a substructure in the fourth embodiment, and FIG. 10 is a cross sectional view taken along line A—A in FIG. 9 with a rail attaching screw being omitted.

A linear guide device constituting a portion of a table apparatus is shown, and a guide rail 101 constituting a part of the linear guide device has two parallel rolling element grooves 111 on both lateral sides 105 for rolling movement of balls relative to a slider not illustrated, and the slider moves relative to the guide rail 101 with rolling movement of the balls.

The guide rail 101 is secured to a substructure 130 with rail attaching screws 120. A plurality of screw insertion holes 102 are formed and perforating from an upper surface 104 of the guide rail 101 to a seat face 103 formed at the bottom for allowing the rail attaching screws 120 to pass through. The screw insertion holes 102 are arranged on a center axial line CLr which is in the longitudinal direction of the guide rail 101. Each screw insertion hole 102 has an upper part and a lower part, and the diameter of the upper part is larger and the diameter of the lower part is smaller. A step is formed therebetween, and the step constitutes a counter head portion 102*a*. The screw insertion hole 102 and a screw hole 131 of the substructure 130 are combined to form a rail attaching screw hole 150. Then, the head of a rail attaching screw 120 is contained in the larger diameter part of the screw insertion hole 102 and seated on the counter head portion 102*a*. And the shaft portion of the rail attaching screw 120 goes through the smaller diameter part of the screw insertion holes 102. The rail attaching screw 120 is screwed in the rail attaching screw hole 150. In this case, a gap is formed between the screw insertion hole 102 of the guide rail 101 and the rail attaching screw 120, and the gap constitutes a gas reservoir 107*a*. Another gap is formed between the bottom of the screw hole 131 in the substructure 130 and the top end of the rail attaching screw 120, and this gap constitutes a gas reservoir 107*b*. Orifices of the screw insertion holes 102 are arranged along the central axial line CLr in the longitudinal direction of the guide rail 101 on the seat surface 103 of the guide rail 101.

A groove 109 with a trapezoidal cross sectional shape is formed on the seat surface 103. The groove 109 is continuous from one end face 106 to the other end face 106 of the guide rail 101 in the lateral central portion of the seat surface 103, and connects the orifices of the screw insertion holes 102 on the seat surface 103 successively.

Then, the operation of the fourth embodiment is to be described.

When the table apparatus is put in evacuated or depressurized circumstances, surroundings of the table apparatus is evacuated or depressurized, and the atmosphere outside surroundings of the guide rail 101 is also evacuated or depressurized. Then, since the end of the groove 109 is open to the outside of the guide rail 101, the condition in the groove 109 is also evacuated or depressurized. Then, since the gas reservoir 107*a* is in communication with the groove 109, the condition in the gas reservoir 107*a* is also evacuated or depressurized. Further, since the gas reservoir 107b is in communication with the groove 109 by way of the gap formed between the threaded grooves which are coupled with each other, and the distance between the gas reservoir 107b and the groove 109 is close, the condition in the gas reservoir 107b is also evacuated or depressurized.

Figure 11:
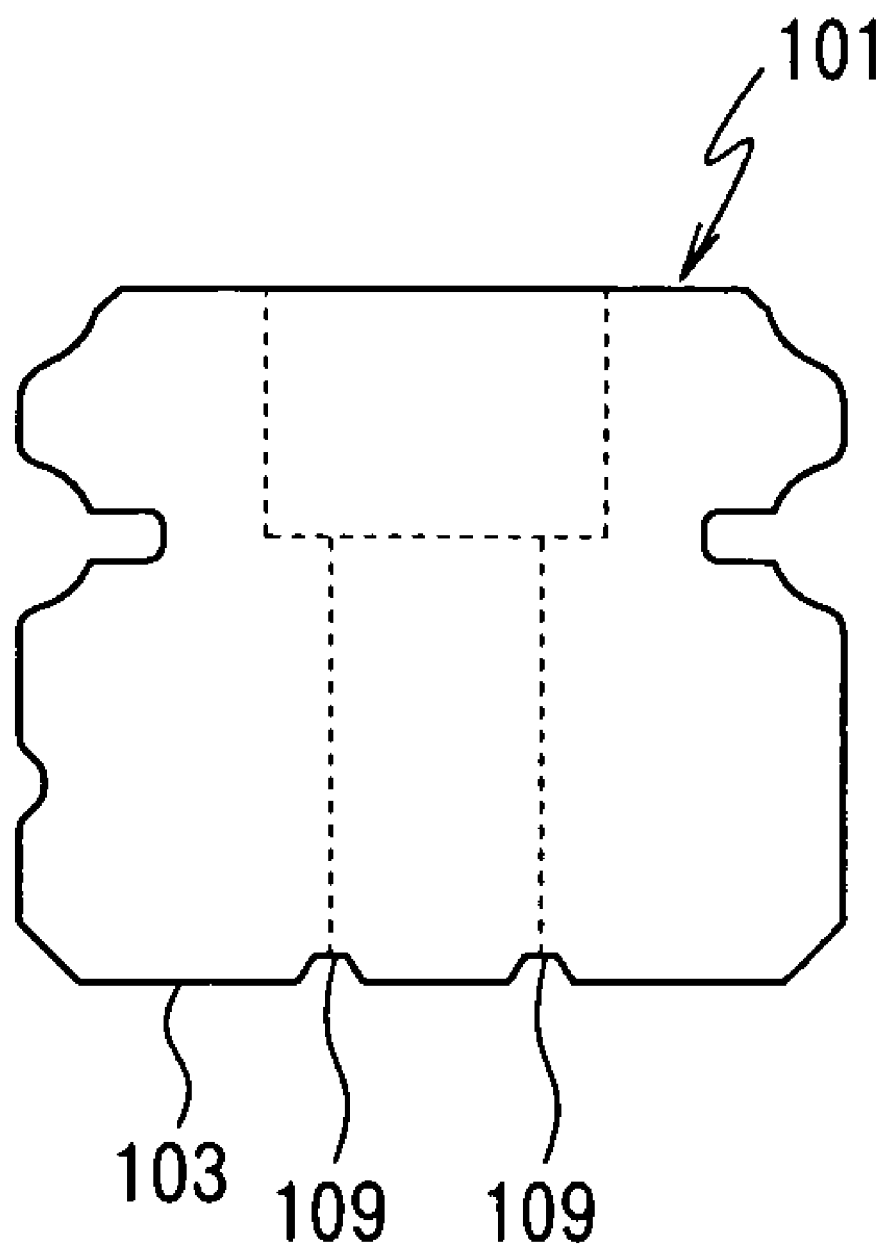
FIG. 11 is an end view of a guide rail according to a modified example of the fourth embodiment.
Figure 12:
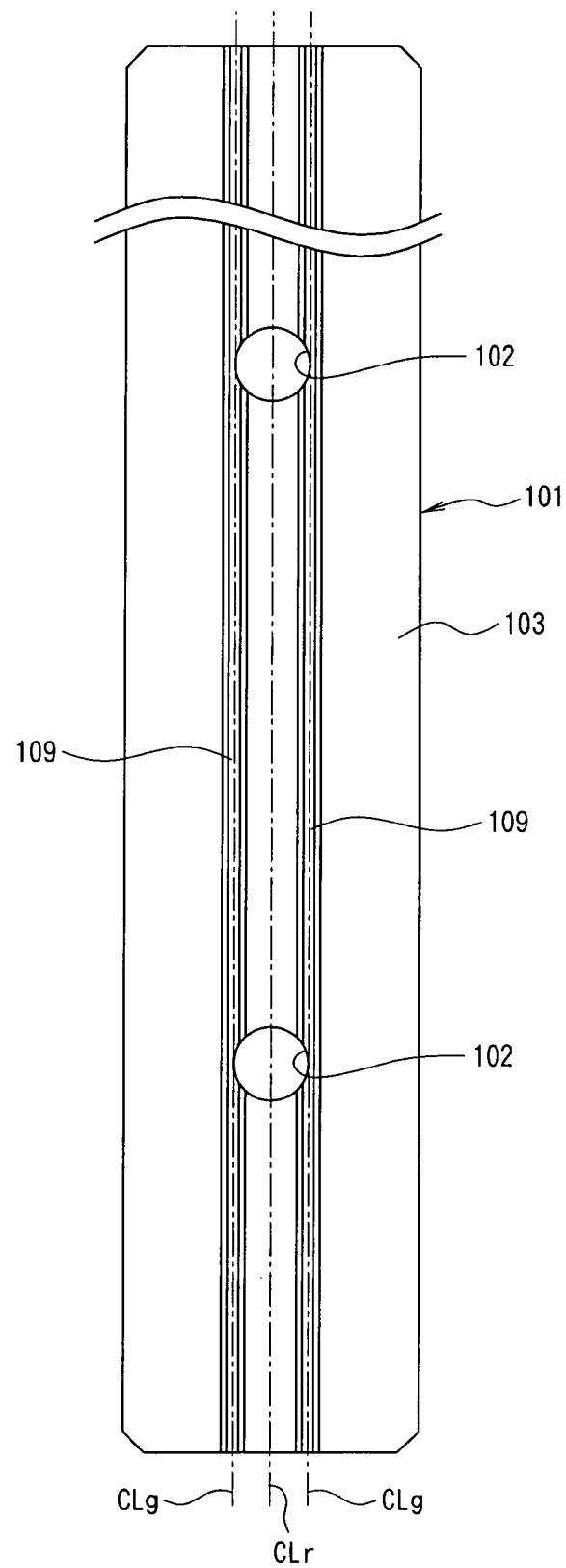
FIG. 12 is a bottom view of FIG. 11.
Figure 13:
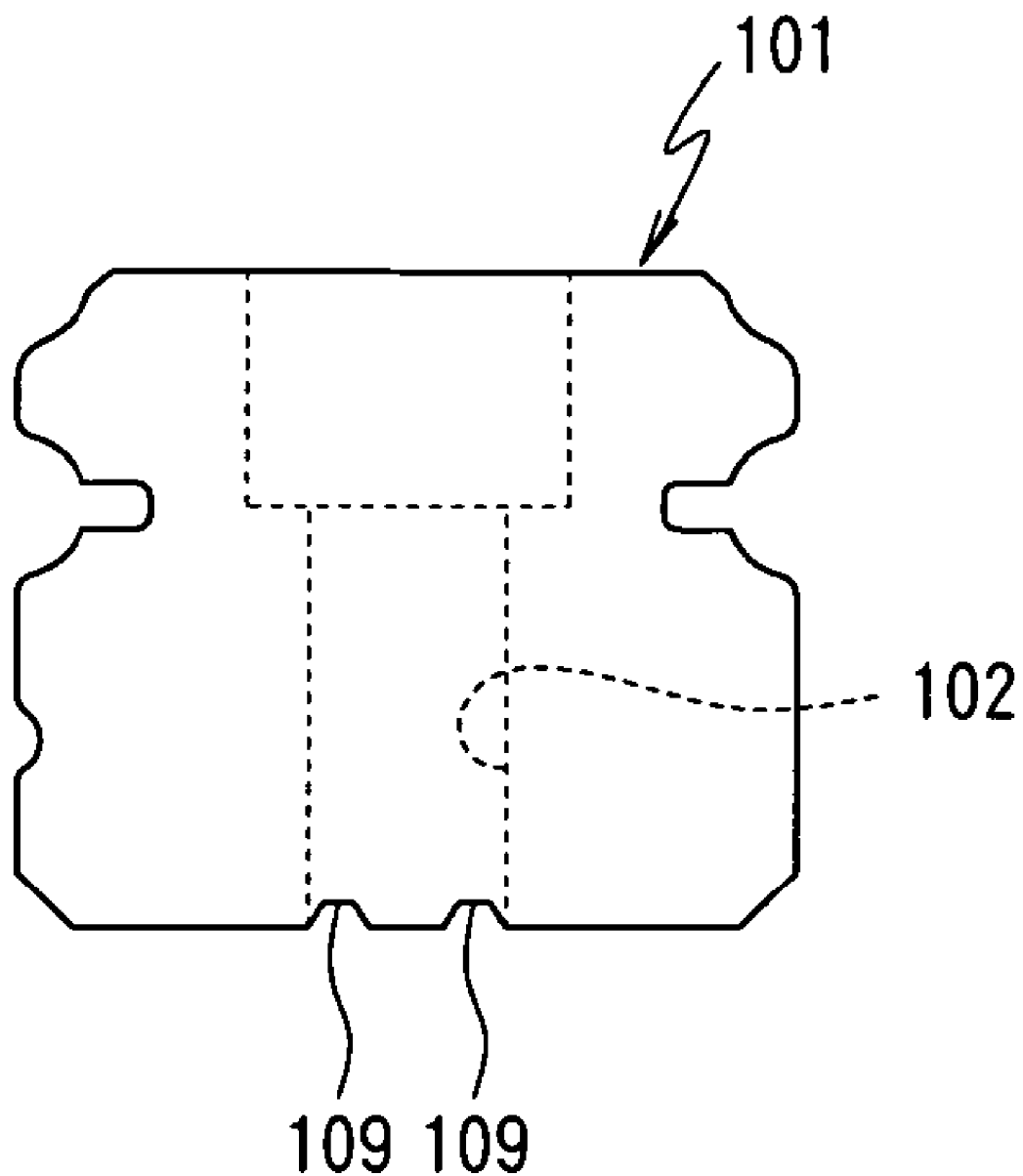
FIG. 13 is an end view of a guide rail with a groove whose position being changed according to a modified example of the fourth embodiment.
Figure 14:
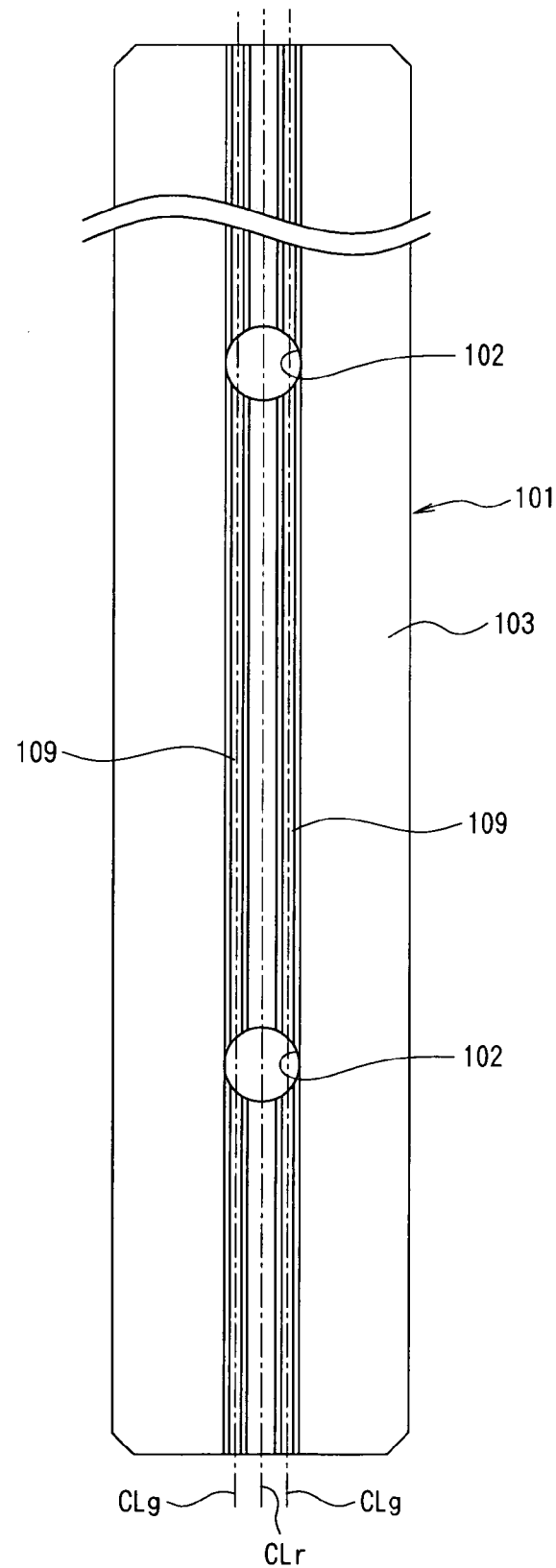
FIG. 14 is a bottom view of FIG. 13.

Further, as shown in FIG. 11 and FIG. 12, two grooves 109 can be formed on the seat surface 103. As shown in FIG. 12, the center axis CLg of each of the two grooves 109 is in contact with circles formed by the screw insertion hole 102 on the seat surface 103. And each screw insertion hole 102 is in communication with both of the grooves 109. Then, as shown in FIG. 13 and FIG. 14, each groove 109 can be formed at the position which is nearer to the central axis CLr of the guide rail 101 than the position shown in FIG. 11 and FIG. 12. And in this position, the central axis CLg of each groove 109 is intersected with the circle formed by the screw insertion hole 102 on the seat surface 103. Further, as shown in FIG. 15(i), (ii) and (iii), the cross sectional shape of the groove 109 can be formed in an arcuate shape, a trigonal shape or a polygonal shape.

Figure 16:
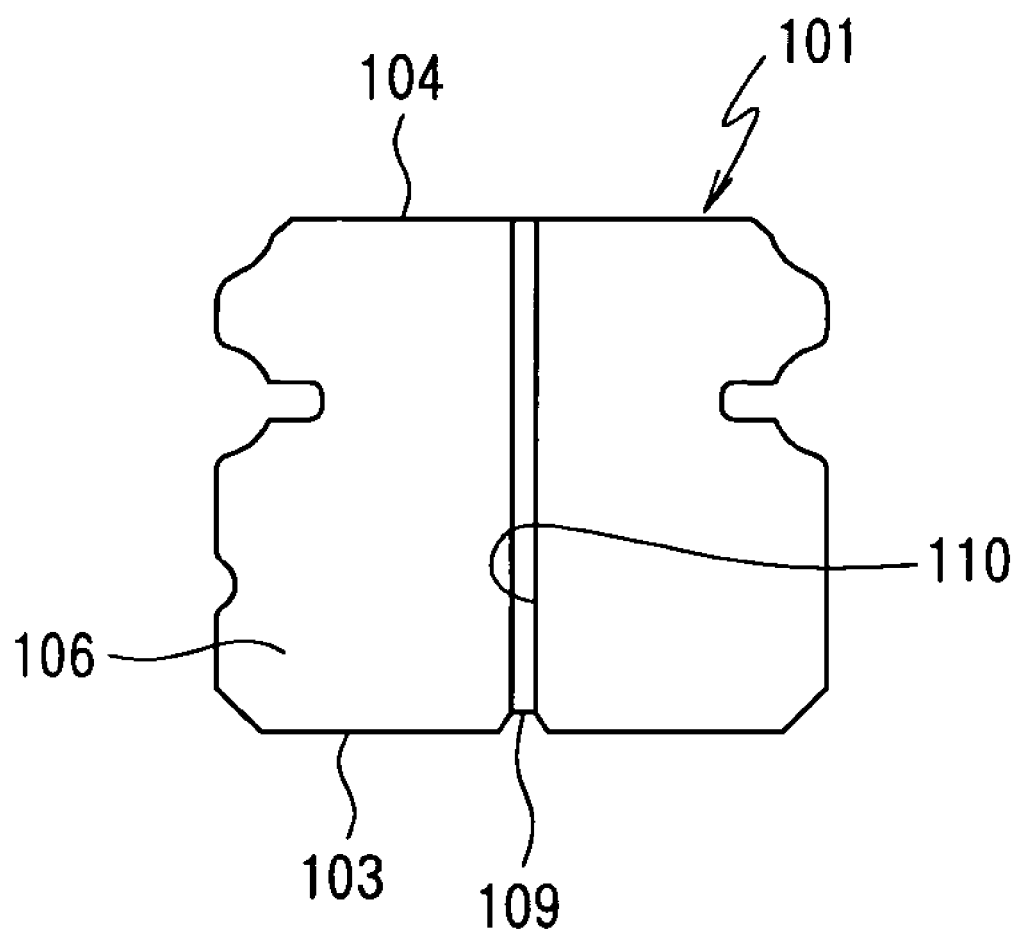
FIG. 16 is an end view of a guide rail according to the fifth embodiment.

Then, a fifth embodiment is to be described with reference to FIG. 16. FIG. 16 shows a fifth embodiment and is an end view of a guide rail.

In the fifth embodiment, a communication channel 110 is added to the guide rail 101 shown in FIG. 7 to FIG. 10 of the fourth embodiment. In this constitution, identical constitutions with those of the fourth embodiment of the invention carry the same reference numerals for which duplicate explanation will be omitted.

A communication channel 110 is formed on the end face 106 of the guide rail 101, and comprises a groove with an identical cross section to the cross section of the groove 109. The communication channel 110 is a linear groove which is continuous from the end of the groove 109 on the seat surface 103 to the upper surface 104, and is in communication with the groove 109 at the corner between the seat surface 103 and the end face 106.

Then, in a case where the end face 106 of the guide rail 101 is covered with a not illustrated member and the linear guide device is put in evacuated or depressurized circumstances, since the end of the communication channel 110 is open to the upper side of the guide rail 101, the condition in the communication channel 110 is also evacuated or depressurized. Then, since the end of the groove 109 is in communication with the communication channel 110, the condition in the groove 109 is also evacuated or depressurized. Accordingly, the condition in the gas reservoirs 107a and 107b is also evacuated or depressurized like the fourth embodiment.

Further, as shown in FIG. 17(i), (ii) and (iii), the communication channel 110 on the end face 106 can be formed by connecting the end of the groove 109 formed on the seat surface 103 of the guide rail 101 with one or both of lateral surfaces 105 or rolling element grooves 111. Further, it is also possible to form a hole as the communication channel 110. The hole perforates through the inside of the guide rail, and is in communication with the groove 109. The hole is connected with at least one of the upper surface 104, lateral surface 105 or the rolling element grooves 111. In a case where the hole forms the communication channel, the position of the hole can be arranged irrelevant to the position of the screw insertion holes 102, the degree of freedom to arrange the position of the hole which perforates through the guide rail is increased. Further, the cross sectional shape of the communication channel 110 on the end face 106 can be formed in an arcuate shape, a trigonal shape or a polytonal shape.

Further, in the fourth and fifth embodiments, while the guide rail 101 is secured to the upper surface of the substructure 130, they can be turned up side down and the guide rail 101 is secured to the lower surface of the substructure 130.

Accordingly, the linear guide device comprising the guide rail 101 according to the fourth and fifth embodiments can provide the same effects as those in the first to third embodiments. Further, it is not necessary to form any gas vent holes individually to each of the screw insertion holes 102 of the guide rail 101 and the screw holes 131 of the substructure 130 as in the first to third embodiments, and the groove 109 on the seat surface 103 can be formed while the guide rail 101 is drawn in its fabrication process or the seat surface 103 of the guide rail 101 is ground in its fabrication process. This can provide an effect capable of manufacturing a linear guide device rapidly and in cost-reduced steps. Further, by forming the groove 109 on the seat surface 103 before forming the rolling element grooves, the fabrication step of the groove 109 gives no undesired effects on the accuracy of the linear guide device.

Further, in the fifth embodiment, also in a case where the end face of the guide rail is covered with other member, remaining air in the gas reservoir can be discharged in a short period of time to attain and maintain the predetermined evacuated or depressurized condition.

Figure 18:
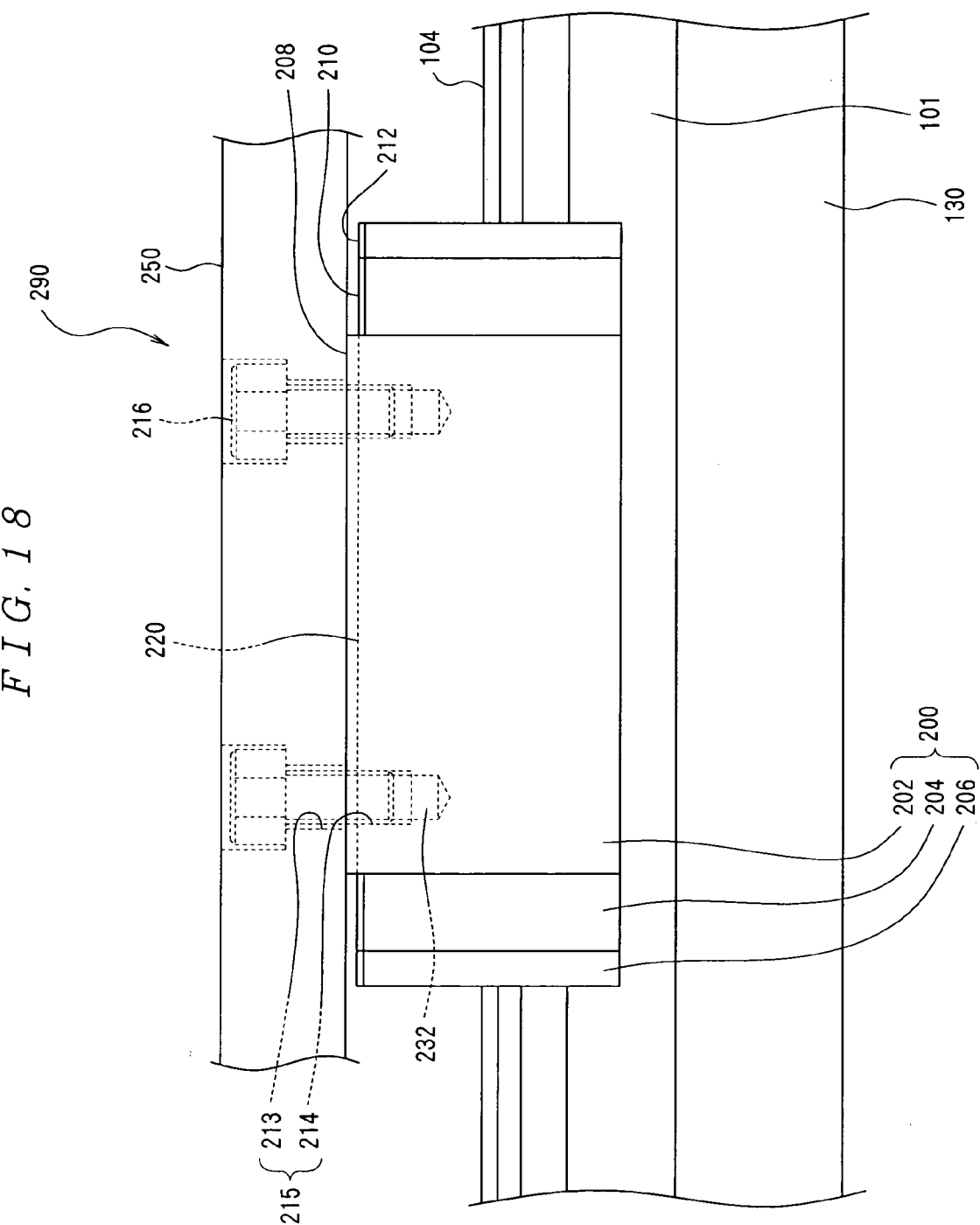
FIG. 18 is a front elevational view of a slider device according to the sixth embodiment.

Then, a sixth embodiment is to be described with reference to FIG. 18 to FIG. 21. FIG. 18 is a front elevation view of a slider device according to the sixth embodiment, FIG. 19 is a side elevational view of the slider device according to the sixth embodiment as viewed in the longitudinal direction of a guide rail, FIG. 20 is an upper plan view of a slider according to the sixth embodiment, and FIG. 21 is a partly cross sectioned side elevational view of the slider according to the sixth embodiment as viewed in the longitudinal direction of the guide rail.

Figure 19:
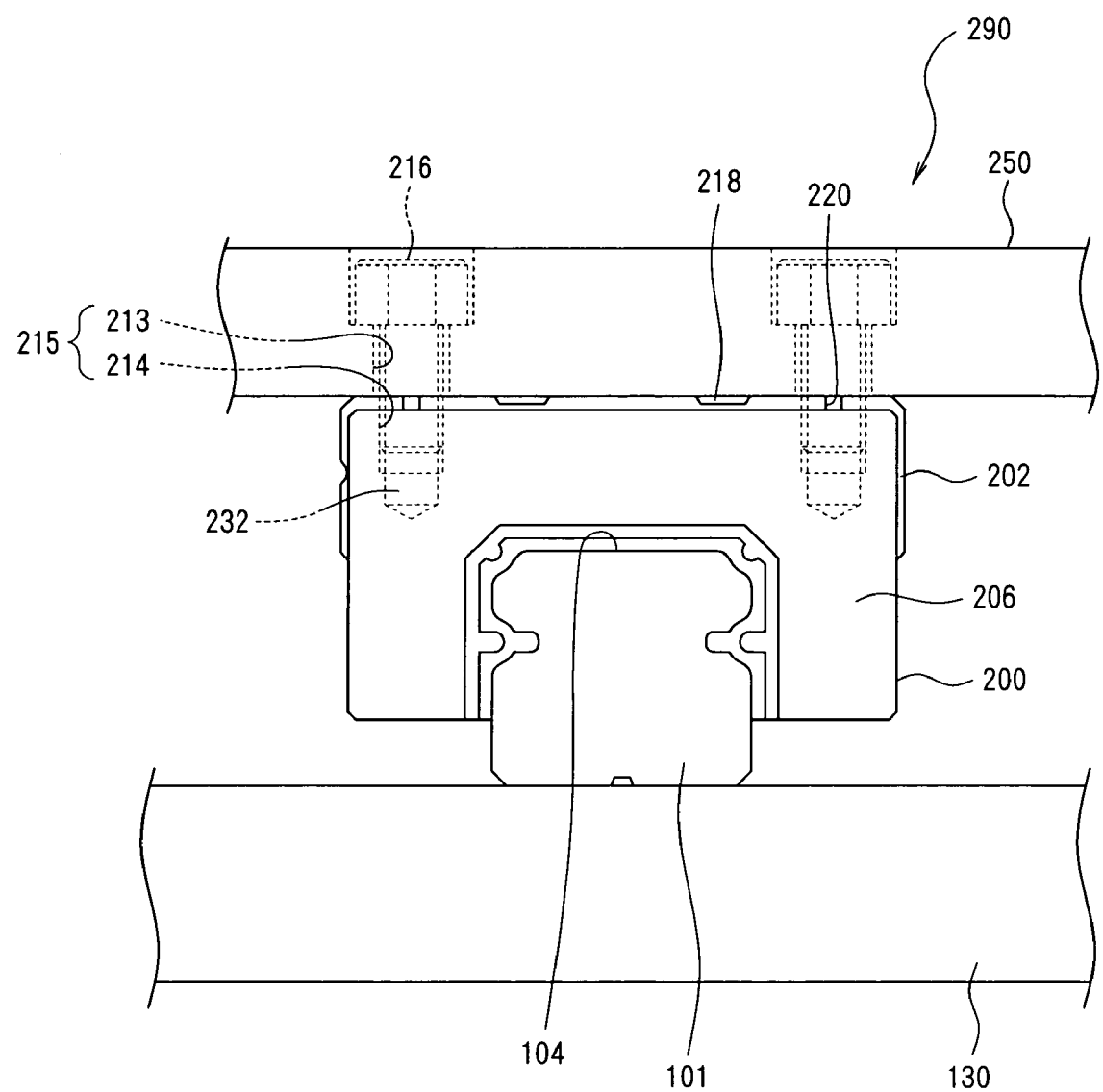
FIG. 19 is a side elevational view of the slider device according to the sixth embodiment in the longitudinal direction of the guide rail.

As shown in FIG. 18 and FIG. 19, a linear guide device comprises a slider 200 and a guide rail 101. Further, a table apparatus 290 comprises the linear guide device, a slider-side member 250 and a substructure 130 as a guide rail-side member. The substructure 130 and the guide rail 101 have the same constitution as the substructure and the guide rail according to the fourth embodiment, which carry identical reference numerals and for which explanation is to be omitted. Further, the slider-side member 250 is of a plate shape with both the surface and the rear face being planar, in which screw insertion holes 213 are formed, and the screw insertion holes 213 perforate through the slider side member 250 from the surface to the rear face are formed.

The slider 200 comprises a slider main body 202, end caps 204 and side seals 206. The upper surface 208 of the slider main body 202 is of a substantially rectangular shape and faces in the same direction as the upper surface 104 of the guide rail 101. The upper surface 210 of the end cap 204 and the upper surface 212 of the side seal 206 also face in the same direction as the upper surface 104 in the same manner. And the upper surfaces 208, 210 and 212 constitute the upper surface of the slider 200. Further, in the upper surface of the slider 200, the upper surface 210 and the upper surface 212 are on one identical plane, and the upper surface 208 constitutes a protruding surface from the upper surface 210 by a step.

Figure 20:
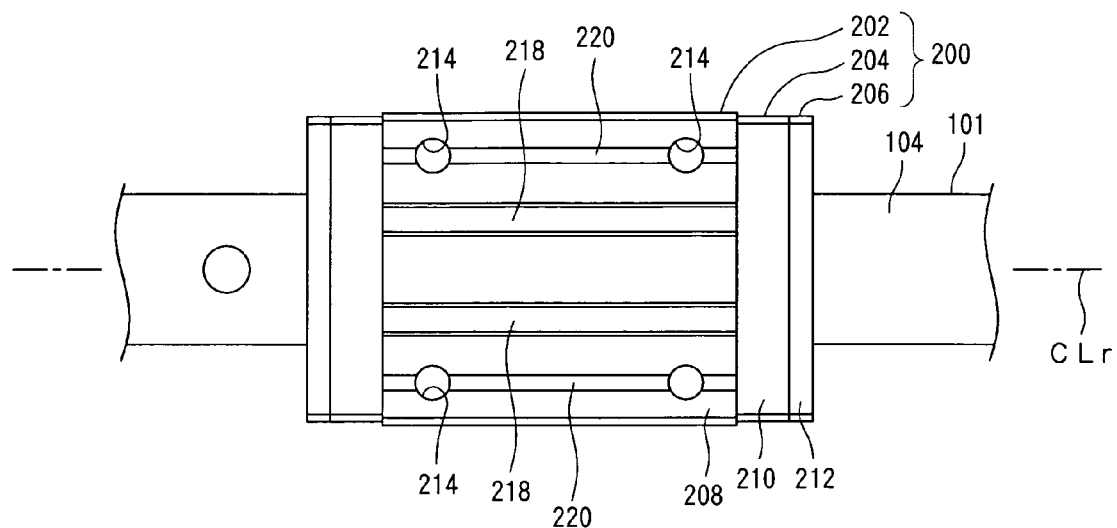
FIG. 20 is an upper plan view of the slider according to the sixth embodiment.
Figure 21:
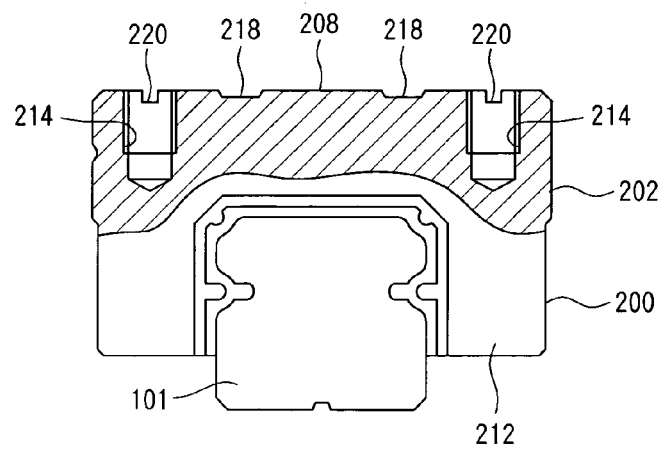
FIG. 21 is a partially cross sectioned side elevational view of the slider in the longitudinal direction of the guide rail according to the sixth embodiment.

Further, screw holes 214 are open respectively at four corners on the diagonal lines of the rectangular shape of the upper surface 208 (refer to FIG. 20). And one screw insertion hole 213 and one screw hole 214 are combined to form a slider main body attaching screw hole 215 (refer to FIG. 18 and FIG. 19). Then, the attaching screws 216 are screwed in the attaching screw holes 215 and the slider-side member 250 is secured to the upper surface 208 of the slider main body 202.

Further, as shown in FIG. 20, two parallel escape grooves 218 are formed on the upper surface 208. Each of the escape grooves 218 is in parallel with the central axis CLr of the guide rail 101, and extends from one edge to the opposite edge of the upper surface 208. When the upper surface 208 is ground, the escape grooves 218 serve to reduce the grinding resistance. Further, two grooves 220 are formed in parallel with the escape grooves 218 respectively. Each of the grooves 220 has a square cross sectional shape (refer to FIG. 21) and, like the escape groove 218, each of the grooves 220 extends from one edge to the opposite edge of the upper surface 208. One of the grooves 220 connects orifices of the two screw holes 214 on one side of the central axis CLr of the guide rail 101 on the upper surface 208. And orifices of other two screw holes 214 are also connected by the other groove 220. Since other constitutions of the slider 200 are identical with those of the existent slider, explanation therefor will be omitted.

Then, the attaching screws 216 are screwed in the attaching screw holes 215, and the slider-side member 250 is secured to the upper surface 208 of the slider main body 202. The rear face of the slider-side member 250 is in contact with the upper surface 208, but the inner surfaces of the groove 220 and the escape groove 218 are not in contact with the rear face of the slider-side member 250. The inner sides of the groove 220 and the escape groove 218 constitute spaces respectively, and each end of the groove 220 and the escape groove 218 is open to the outside of the table apparatus at the edge of a portion where the upper surface 208 and the rear face of the slider-side member 250 are in contact with each other (refer to FIG. 18 and FIG. 19). Further, a gas reservoir 232 is formed between the attaching screw hole 215 and the attaching screw 216.

Then, the operation of the sixth embodiment is to be described.

In this embodiment, the effect of the groove 220 on the remaining air in the gas reservoir 232 is identical with the effect of the groove 109 in the fourth embodiment on the remaining air in the gas reservoirs 107a and 107b. That is, when the table apparatus 290 with the linear guide device is put under evacuated or depressurized circumstances, the condition in the groove 220 which is in communication with the outside of the table apparatus 290 with the linear guide device is also evacuated or depressurized. And the condition in the gas reservoir 232 which is in communication with the groove 220 is also evacuated or depressurized. Accordingly, the condition in the gas reservoir 232 is evacuated or depressurized in a short period of time.

In the sixth embodiment, the cross sectional shape of the groove 220 is formed in rectangular shape, but it can be of an arcuate shape as shown in (i) of FIG. 22, a trigonal shape as sown in (ii) of the figure, a polygonal shape as shown in (iii) of the figure or the like.

Further, the grooves 220 are formed in parallel with the escape grooves 218, but, as shown in (i) of FIG. 23, on the upper surface 208 of the slider main body 202, the grooves 220 can be formed such that the grooves 220 cross at a right angle with the escape grooves 218 to connect screw holes 214. Further, as shown in (ii) of the figure, the grooves 220 can be formed on the upper surface 208 between the escape groove 218 and one edge of the upper surface 208. Further, as shown in (iii) of the figure, the grooves 220 can also be formed such that they are substantially aligned with the diagonal lines of the square forming the upper surface 208.

Accordingly, the linear guide device or the table apparatus with the slider main body 202 according to the sixth embodiment can provide the same effects as the first to third embodiments. Furthermore, it is not required to form any gas vent holes to the slider main body 202 and the slider-side member 250 individually. And the grooves 220 can be formed when the upper surface 208 of the slider main body 202 is ground. Therefore the linear guide device can be manufactured with rapid and inexpensive steps.

In the fourth to sixth embodiments described above, an example is shown, in which the groove 109 is in contiguous from one end face to the other end face of the guide rail 101, as well as another example in which the groove 220 is in contiguous from one end face (lateral surface) to the other end face (lateral surface) of the slider main body 202 so as to pass two screw holes 214. But these examples are not restrictive. The groove 109 or the groove 220 in communication with the outer surface of the guide rail 101 or the slider main body 202 can be formed each by one on every screw insertion hole 102 or screw hole 214 respectively.

Figure 24:
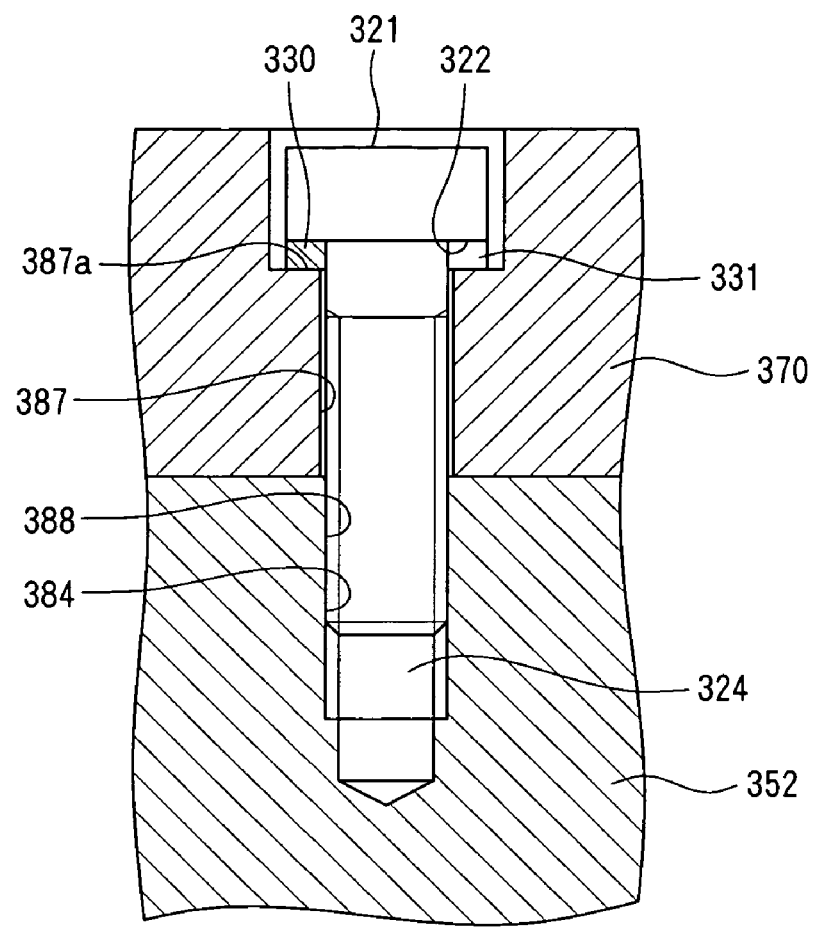
FIG. 24 is a fragmentary vertical cross sectional view of a slider according to the seventh embodiment.
Figure 25:
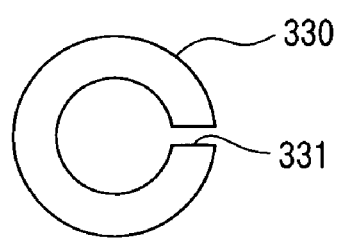
FIG. 25 is an upper plan view of the washer according to the seventh embodiment.
Figure 26:
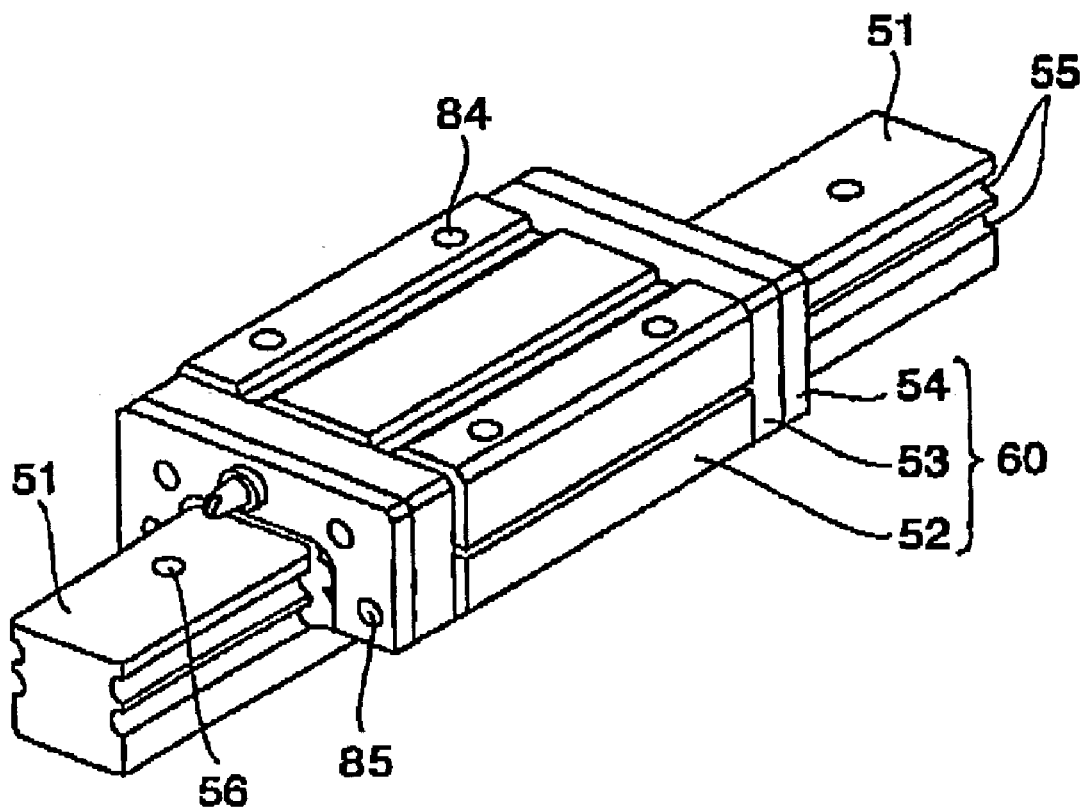
FIG. 26 is a perspective view of a guide rail and a slider constituting an existent linear guide device.

Then, a seventh embodiment is to be described with reference to FIG. 24 and FIG. 25. FIG. 24 is a fragmentary longitudinal cross sectional view of a slider according to the seventh embodiment and FIG. 25 is an upper plan view of a washer according to the seventh embodiment.

A table apparatus has the same constitution as that in the existent table apparatus in which a slider main body 352 and a plate-like slider-side member 370 constitute a portion of the table apparatus. As shown in FIG. 24, a screw hole 384 is formed to the slider main body 352, a screw insertion hole 387 is formed to the slider-side member 370. The screw hole 384 and the screw insertion hole 387 are combined to form an attaching screw hole 388. Further, a counter head 387a is formed in the screw insertion hole 387.

Then, an attaching screw 321 is screwed in the attaching screw hole 388 and the slider-side member 370 is secured to the slider main body 352 with the attaching screw 321. Further, the lower surface 322 of the head of the attaching screw 321 is seated on the counter head 387a. Further, a gas reservoir 324 is formed in a gap between the attaching screw 321 and the attaching screw hole 388.

Further, a washer 330 is interposed between the lower surface 322 of the head of the attaching screw 321 and the counter head 387a. As shown in FIG. 25, the washer 300 has the same constitution as the existent spring washer that is interposed between clamping surfaces of a bolt and a nut. That is, the washer 330 has a ring-shape with a hole at the center of the ring, and a screw shaft of the attaching screw 321 goes through the hole. And the washer 330 has a gap which cuts the circumference of the ring. The gap forms a channel 331. At the center of the ring of the washer 330, the diameter of the hole is larger than the diameter of the screw shaft of the attaching shaft 321 and smaller than the diameter of the head of the attaching screw 321.

Then, the operation of the seventh embodiment is to be described.

In a state where the attaching screw 321 is screwed in the attaching screw hole 388, the washer 330 is put and secured between the lower surface 322 of the head of the attaching screw 321 and the counter head 387a of the screw insertion hole 387. The channel 331 links the outside of the washer 330 to the hole at the center of the ring. And the end of the channel 331 at the hole side of the ring of the washer 330 situates just above the gap between the attaching screw 321 and the screw insertion hole 387. Accordingly, the gas reservoir 324 is in communication with the outside of the table apparatus through the channel 331.

Accordingly, when the table apparatus is put under evacuated or depressurized circumstances, air is discharged from the gas reservoir 324 in a short period of time, and the condition in the gas reservoir 324 is rapidly evacuated or depressurized.

Further, in this embodiment, the description has been made to securing the slider main body 352 to the slider-side member 370. But it is apparent that the washer 330 of this embodiment can be applied to a screw hole formed in any of the members constituting the table apparatus and a screw which is screwed in the screw hole.

Further, in this embodiment, an example is shown in which the washer 330 is a spring washer with a gap, it can be a flat washer with a gap instead of the spring washer. Further, instead of the gap, it can be a groove or a hole which links the inner side to the outer, the groove is formed to at least one of the surface or the rear face of the washer, and the hole perforates through the washer.

INDUSTRIAL APPLICABILITY

Since the present invention provides a guide rail for the linear guide device as described above, it provides the following effects. That is, it can provide a linear guide device suitable to be used in an evacuated or depressurized circumstances without using any special screws formed with a gas vent hole, as well as a table apparatus with the linear guide device described above.

The invention claimed is:

1. A table apparatus for use in a depressurized environment, the table apparatus comprising attached components including:
    a guide rail component;
    a slider component;
    a guide rail side member component that is attached to the guide rail component;
    a slider side member component that is attached to the slider component;
    a side seal and end cap assembly component that is attached to the slider component, said table apparatus further comprising:
    a receiving portion defining a hole formed in a respective pair of said attached components;
    a joining member in said receiving portion for performing one of the attachments;
    a first gas reservoir formed between the joining member and an inner side wall of the receiving portion;
    a second gas reservoir formed between the joining member and a distal end of the receiving portion, and
    a gas vent hole formed through one of said attached components providing fluid communication from an outside of the table apparatus to both the first gas reservoir and the second gas reservoir, wherein the first gas reservoir is in direct fluid communication with the gas vent hole and the second gas reservoir is in fluid communication with the gas vent hole via the first gas reservoir.

2. A table apparatus for use in a depressurized environment, the table apparatus comprising attached components including:
    a guide rail component;
    a guide rail side member component that is attached to said guide rail component;
    a slider component;
    a slider side member component that is attached to said slider component; and
    a side seal and end cap assembly component that is attached to the slider component; said table apparatus further comprising:
    a receiving portion defining a hole formed in a respective pair of said attached components;
    a joining member in said receiving portion for performing one of the attachments;
    a first gas reservoir formed between the joining member and an inner side wall of the receiving portion;
    a second gas reservoir formed between the joining member and a distal end of the receiving portion, and
    a gas vent hole formed through one of said attached components providing fluid communication from an outside of the table apparatus to each of the first gas reservoir and the second gas reservoir,
    wherein air in the gas reservoirs is discharged to the outside of the table apparatus through the gas vent hole when the apparatus is placed in a depressurized environment, and the first gas reservoir is in direct fluid communication with the gas vent hole and the second gas reservoir is in fluid communication with the gas vent hole via the first gas reservoir.

3. A vacuum apparatus having a table apparatus incorporated therein, the table apparatus comprising attached components including:
    a guide rail component;
    a guide rail side member component that is attached to said guide rail component;
    a slider component;
    a slider side member component that is attached to said slider component; and
    a side seal and end cap assembly component that is attached to the slider component; said table apparatus further comprising:
    a receiving portion defining a hole formed in a respective pair of said attached components;
    a joining member in said receiving portion for performing one of the attachments;
    a first gas reservoir formed between the joining member and an inner side wall of the receiving portion;
    a second gas reservoir formed between the joining member and a distal end of the receiving portion, and
    a gas vent hole formed through one of said attached components providing fluid communication from an outside of the table apparatus to each of the first gas reservoir and the second gas reservoir, wherein the first gas reservoir is in direct fluid communication with the gas vent hole and the second gas reservoir is in fluid communication with the gas vent hole via the first gas reservoir.

* * * * *